(12) United States Patent
Izhaki et al.

(10) Patent No.: US 12,603,821 B2
(45) Date of Patent: *Apr. 14, 2026

(54) NETWORK SLICE FEASIBILITY ASSESSMENT FOR A LATENCY-BASED SERVICE LEVEL AGREEMENT (SLA)

(71) Applicant: QUALCOMM Incorporated, San Diego, CA (US)

(72) Inventors: Gal Izhaki, Haifa (IL); Andrei Vadeanu, Bucharest (RO); Daniel Yellin, Raanana (IL); Atanu Basudeb Halder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/425,987

(22) Filed: Jan. 29, 2024

(65) Prior Publication Data

US 2025/0247310 A1     Jul. 31, 2025

(51) Int. Cl.
| | |
|---|---|
| G06F 15/173 | (2006.01) |
| H04L 41/16 | (2022.01) |
| H04L 41/5025 | (2022.01) |

(52) U.S. Cl.
CPC .......... H04L 41/5025 (2013.01); H04L 41/16 (2013.01)

(58) Field of Classification Search
CPC ..... H04L 43/0852; H04L 43/16; H04L 41/40; H04L 41/5054; H04W 24/02
See application file for complete search history.

(56) References Cited

U.S. PATENT DOCUMENTS

| | | | |
|---|---|---|---|
| 2021/0144790 A1* | 5/2021 | Faccin | .................. H04W 76/18 |
| 2022/0264389 A1* | 8/2022 | Naseer-Ul-Islam | ........................ H04W 36/0072 |

(Continued)

FOREIGN PATENT DOCUMENTS

| | | |
|---|---|---|
| WO | WO-2023283102 A1 | 1/2023 |
| WO | WO-2025010118 A1 | 1/2025 |

OTHER PUBLICATIONS

3GPP: "3rd Generation Partnership Project, Technical Specification Group Services and System Aspects, Management and Orchestration, Provisioning, (Release 18)", 3GPP Standard, Technical Specification, 3GPP TS 28.531, 3rd Generation Partnership Project, Mobile Competence Centre, 650, Route Des Lucioles, F-06921 Sophia-Antipolis Cedex, France, vol. SA WG5, No. V18.4.0, Dec. 2023, 87 Pages, Jan. 5, 2024, XP052576438, Chapters 5,7.

(Continued)

*Primary Examiner* — Padma Mundur
(74) *Attorney, Agent, or Firm* — Holland & Hart LLP/Qualcomm

(57)     ABSTRACT

This disclosure provides systems, methods, devices, and apparatuses, including computer programs encoded on computer storage media, for network slice feasibility assessment for a latency-based service level agreement (SLA). Some aspects relate to providing on-demand approval or rejection of a network slice request at a device in accordance with a latency threshold associated with an SLA of the requested network slice. In some implementations, the device may receive load information associated with the requested network slice. The device may select, in accordance with the latency threshold and the load information, a resource allocation for the network slice. In some implementations, the device may output an indication to accept or reject the network request according to the resource allocation. In some implementations, the device may use one or more (Continued)

machine learning (ML) models to select the acceptance or rejection of the network slice request, to select the resource allocation, or both.

29 Claims, 10 Drawing Sheets

(56)                    References Cited

U.S. PATENT DOCUMENTS

| | | | |
|---|---|---|---|
| 2023/0139546 A1 | 5/2023 | Song et al. | |
| 2024/0224099 A1* | 7/2024 | Dhamija | H04L 41/40 |
| 2024/0349121 A1* | 10/2024 | Feder | H04W 40/24 |
| 2025/0016627 A1 | 1/2025 | Izhaki et al. | |

OTHER PUBLICATIONS

International Search Report and Written Opinion—PCT/US2024/060120—ISA/EPO—Mar. 20, 2025.
O-RAN WG 1: "O-RAN.WG1.Slicing-Architecture-R003-v12.00", Technical Specification, Slicing Architecture, O-RAN Alliance, Nov. 16, 2013, 72 Pages, XP093247535, Chapters 5,7.

* cited by examiner

402 — NSMF E2E Orchestrator

410 — Ecosystem Tools

• • •     • • •

408 — Automation Apps

• • •     • • •

404 — Slice Manager

RAN NSSMF

406

414 — Message Bus

412 — API Gateway

416 — Stateless Mediation

DML

418

420 — Data Producers

S-RAN

422 vRAN

424

O-RAN

426

400

502
NSMF

504
RAN NSSMF

506

RAN SMO

Slice Policies ~512
Slice Inventory ~514
ML/AI Models ~516
PGW ~518 rApps 508

Resource Allocation ~520
Slice Feasibility ~522
Slice Configuration ~524

PGW-A1
PGW-O1

526
528

Traditional RAN
530

O-RAN Functions
532

500

Figure 9:
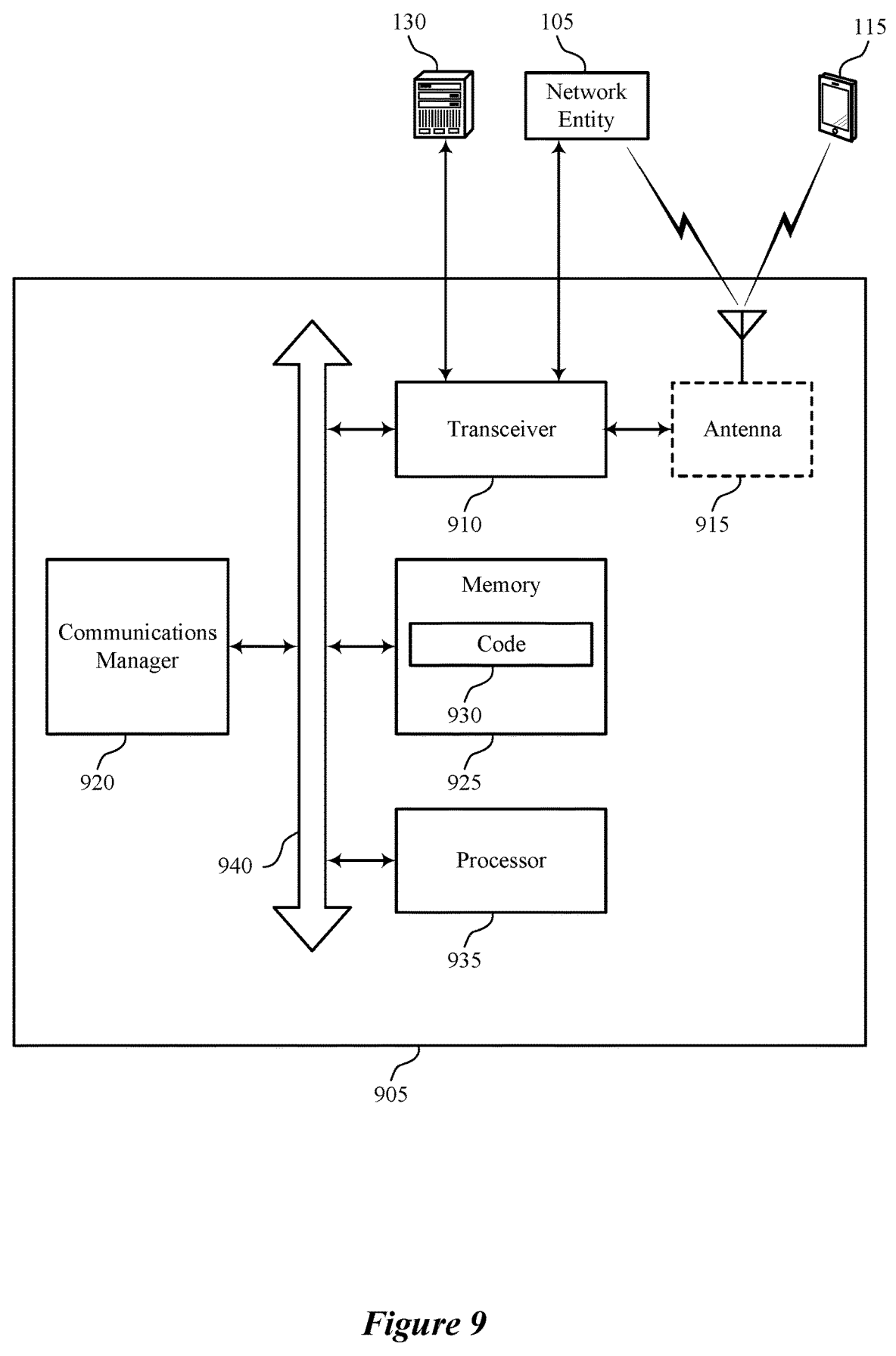

130    105    115

Network
Entity

Transceiver

Antenna 910    915

Communications
Manager

Memory

Code

930

920    925

940

Processor

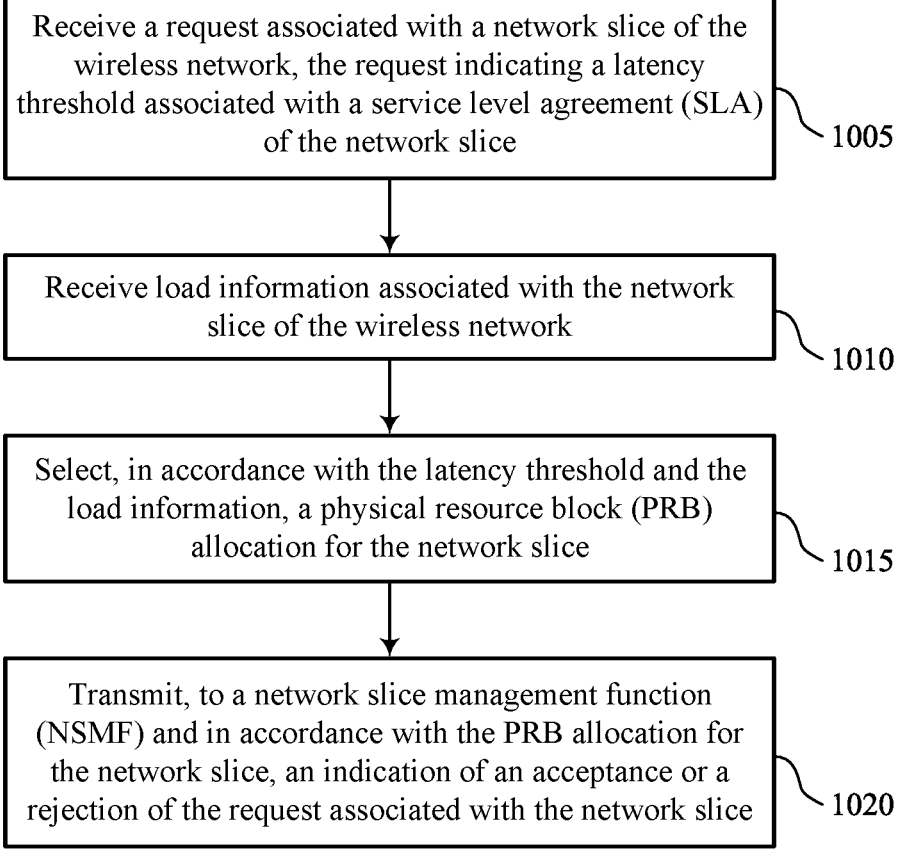

Receive a request associated with a network slice of the wireless network, the request indicating a latency threshold associated with a service level agreement (SLA) of the network slice    1005

Receive load information associated with the network slice of the wireless network    1010

Select, in accordance with the latency threshold and the load information, a physical resource block (PRB) allocation for the network slice    1015

Transmit, to a network slice management function (NSMF) and in accordance with the PRB allocation for the network slice, an indication of an acceptance or a rejection of the request associated with the network slice    1020

NETWORK SLICE FEASIBILITY ASSESSMENT FOR A LATENCY-BASED SERVICE LEVEL AGREEMENT (SLA)

TECHNICAL FIELD

This disclosure relates to wireless communications and, more specifically, to a network slice feasibility assessment for a latency-based service level agreement (SLA).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a device associated with service management of a wireless network. The device may include a processing system that includes processor circuitry and memory circuitry that stores code. The processing system may be configured to cause the device to obtain a request associated with a network slice of the wireless network, the request indicating a latency threshold associated with a service level agreement (SLA) of the network slice, and obtain load information associated with the network slice of the wireless network. The processing system may be further configured to cause the device to select, in accordance with the latency threshold and the load information, a physical resource block (PRB) allocation for the network slice and output, to a network slice management function (NSMF) and in accordance with the PRB allocation for the network slice, an indication of an acceptance or a rejection of the request associated with the network slice.

Another innovative aspect of the subject matter described in this disclosure can be implemented in a method for network slice management for a wireless network. The method may include receiving a request associated with a network slice of the wireless network, the request indicating a latency threshold associated with an SLA of the network slice, and receiving load information associated with the network slice of the wireless network. The method may further include selecting, in accordance with the latency threshold and the load information, a PRB allocation for the network slice and transmitting, to an NSMF and in accordance with the PRB allocation for the network slice, an indication of an acceptance or a rejection of the request associated with the network slice.

Another innovative aspect of the subject matter described in this disclosure can be implemented in a device associated with service management of a wireless network. The device may include one or more memories storing processor executable code and one or more processors coupled with the one or more memories. The one or more processors may individually or collectively be operable to execute the code to cause the device to obtain a request associated with a network slice of the wireless network, the request indicating a latency threshold associated with an SLA of the network slice, and obtain load information associated with the network slice of the wireless network. The one or more processors may individually or collectively be further operable to execute the code to cause the device to select, in accordance with the latency threshold and the load information, a PRB allocation for the network slice and output, to an NSMF and in accordance with the PRB allocation for the network slice, an indication of an acceptance or a rejection of the request associated with the network slice.

Another innovative aspect of the subject matter described in this disclosure can be implemented in a device associated with service management of a wireless network. The device may include means for receiving a request associated with a network slice of the wireless network, the request indicating a latency threshold associated with an SLA of the network slice, and means for receiving load information associated with the network slice of the wireless network. The device may further include means for selecting, in accordance with the latency threshold and the load information, a PRB allocation for the network slice and means for transmitting, to an NSMF and in accordance with the PRB allocation for the network slice, an indication of an acceptance or a rejection of the request associated with the network slice.

Another innovative aspect of the subject matter described in this disclosure can be implemented in a non-transitory computer-readable medium storing code for network slice management in a wireless network. The code may include instructions executable by a processing system to obtain a request associated with a network slice of the wireless network, the request indicating a latency threshold associated with an SLA of the network slice, and obtain load information associated with the network slice of the wireless network. The code may further include instructions executable by the processing system to select, in accordance with the latency threshold and the load information, a PRB allocation for the network slice and output, to an NSMF and in accordance with the PRB allocation for the network slice, an indication of an acceptance or a rejection of the request associated with the network slice.

In some implementations, the request associated with the network slice further indicates a throughput threshold associated with the SLA of the network slice, and the PRB allocation for the network slice is selected further in accordance with the throughput threshold.

In some implementations, the devices, method, and non-transitory computer-readable medium can include operations, features, means, or instructions for selecting, in accordance with the PRB allocation for the network slice, a respective PRB allocation of the network slice for each cell of a set of cells of the wireless network associated with the network slice, where the indication of the acceptance or the rejection of the request associated with the network slice may be in accordance with a respective PRB utilization at each cell of the set of cells and the respective PRB allocation of the network slice for each cell of the set of cells.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 9 shows a block diagram of an example device that supports a network slice feasibility assessment for a latency-based SLA.

FIG. 10 shows a flowchart illustrating a method that supports a network slice feasibility assessment for a latency-based SLA.

Like reference numbers and designations in the various drawings indicate like elements.

DETAILED DESCRIPTION

Figure 1:
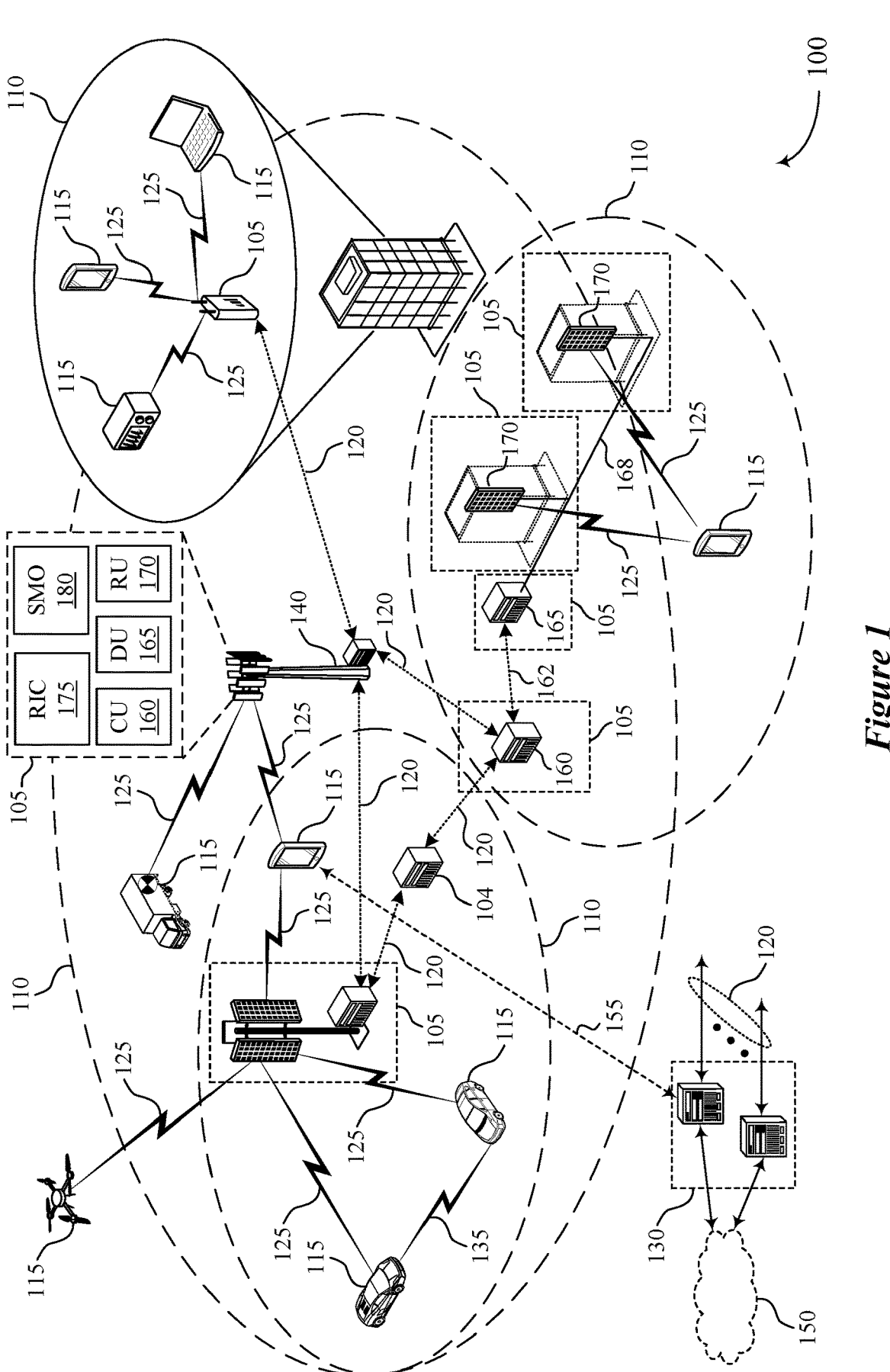
FIG. 1 shows an example wireless communications system that supports a network slice feasibility assessment for a latency-based service level agreement (SLA).

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G), fifth generation (5G), or sixth generation (6G), or further implementations thereof, technology.

Various aspects relate generally to providing an approval or a rejection of a network slice request associated with a latency-sensitive service level agreement (SLA). Some aspects more specifically relate to a device receiving a request for a network slice (such as a new network slice or an updated network slice), where the request indicates a latency threshold for the SLA of the requested network slice. In some aspects, the device may additionally receive load information associated with the requested network slice, where the load information may include simulated or observed quantities of users (such as user equipments (UEs), IoT devices, vehicle-to-everything (V2X) entities, augmented reality/virtual reality/extended reality device (AR/VR/XR), sensors, or any combination of these or other network consumers) served by cells of the requested network slice. In some implementations, the device may select (such as predict, calculate, estimate, ascertain, or otherwise determine) a physical resource block (PRB) allocation for the requested network slice in accordance with (such as to satisfy) the latency threshold associated with the SLA and the load information. For example, the device may select respective PRB allocations for each cell of the requested network slice. The device may perform a feasibility assessment for the network slice request in accordance with the PRB allocation. In some aspects, the feasibility assessment may involve assessing whether a coverage area of the requested network slice can support (such as satisfy) the latency threshold associated with the SLA of the requested network slice. In some implementations, the feasibility assessment may involve the device selecting (such as predicting, calculating, ascertaining, or otherwise determining) to approve or reject the network slice request in accordance with the PRB allocation. The device may output, to a network slice management function (NSMF), an indication of the acceptance or the rejection of the network slice request. In some aspects, the device may be associated with (such as be a component of or otherwise perform functionality relating to) the NSMF, a multi-domain orchestrator (MDO), an MDO and inventory (MDOI), a network slice subnet management function (NSSMF), a radio access network (RAN) domain orchestrator (DO), service management and orchestration (SMO), or some combination thereof. In some implementations, the NSMF may accept or reject the network slice request according to the indication output by the device. In some implementations, the SLA of the requested network slice may additionally indicate a throughput parameter (such as a throughput threshold) of the requested network slice. In some aspects, the SLA may indicate an uplink latency threshold, a downlink latency threshold, an end-to-end latency threshold (such as including core transport and RAN latency components), an uplink throughput threshold, a downlink throughput threshold, or any combination of these or other SLA characteristics for the requested network slice.

In some implementations, the device may use one or more machine learning (ML) models to select the PRB allocation for the requested network slice, to select whether to accept or reject the network slice request, or both. In some aspects, the device may use a first ML model to select the PRB allocation for the network slice, a second ML model to select the acceptance or rejection of the network slice request, or both. In some implementations, an ML model may be an example of an artificial intelligence (AI) model, an artificial neural network (ANN), or any other program, engine, algorithm, or system using ML or AI techniques. In some aspects, the device may train (such as configure) an ML model to output the PRB allocation for the network slice. In some implementations, the device may train the ML model using a set of multiple network snapshots. A network snapshot may be an example of a specific set of network parameters, such as load information, radio frequency (RF) conditions, traffic patterns, the network infrastructure (such as the physical locations of cells and cell coverage areas), or any combination of these or other parameters, and a resulting latency for the network. In some aspects, the latency may be an example of an air interface latency, such as an over-the-air latency, for wireless communications. The device may train the ML model to receive, as inputs, a set of network parameters (such as corresponding to a network snapshot) for a network slice and a latency threshold and to output a corresponding quantity of PRBs (such as a PRB allocation for one or more cells) to support the network slice in accordance with the latency threshold. In some implementations, the device may train the ML model, or another ML model, to receive, as inputs, the set of network parameters for the network slice, the latency threshold, the quantity of PRBs, or any combination thereof and to output an indication of an acceptance or a rejection of the network slice request associated with the network slice and the latency threshold. In some aspects, the device may accept or reject the network slice request according to whether the NSSMF or RAN-DO can allocate the cells of the network slice the quantity of PRBs to satisfy the latency threshold (such as given the simulated or observed network parameters for the network slice).

Particular aspects of the subject matter described in this disclosure can be implemented to realize one or more of the following potential advantages. In some implementations, by selecting the PRB allocation for the requested network slice, the device may determine (or otherwise assess, select, or predict) a quantity of PRBs to add to a network slice to support a latency component (such as a latency threshold) of the SLA. Accordingly, the device may provide accurate empirical resource allocation predictions, which may allow, enable, or otherwise facilitate more efficient spectrum usage for network slice configurations. Additionally, or alternatively, by using one or more techniques (such as the feasibility assessment or an ML model), the device may accurately assess a spectrum portion (such as the quantity of PRBs) to support the latency threshold associated with the SLA. In some aspects, a mobile network operator (MNO) may use such assessments to perform network design, supporting accurate cost analysis (such as from a frequency spectrum perspective) associated with offering different network slice implementations (such as different types of network slices, different network slice parameters, different SLAs, different MNO slicing strategies, or any combination thereof) to different users, customers, enterprises, or other entities. Additionally, or alternatively, the MNO may use such assessments to ensure approval of slice requests if the frequency spectrum can support the PRB allocation determined for a slice request. In some implementations, the MNO may mitigate, or otherwise avoid, network slice violations (such as a latency violation, as defined by the latency threshold of the SLA) after network slice activation by accurately determining the PRB allocation to support the network slice in accordance with the latency threshold without violations. In some implementations, in accordance with selecting the PRB allocation for the requested network slice, the device may assess a network slice profitability for a network slice request. In some implementations, by using load information, the device may account for a quantity of users (such as simulated users or observed users) served by the network slice. In some aspects, the device may support automatic configuration of one or more parameters for network slice configuration. For example, the device may support automatic approval or rejection of the network slice request, automatic configuration of PRBs for the requested network slice, or both. In some implementations, in accordance with conditioning an approval or rejection of a requested network slice as described herein, the device may allow a user or MNO to adjust one or more evaluation thresholds to network-specific performance, which may provide greater flexibility and more granular control over whether and how a requested network slice is admitted. In accordance with such timely predictions, more efficient spectrum usage (which may be understood as greater spectral efficiency), greater flexibility, and more granular control, the described techniques may be further implemented to realize, achieve, or support higher data rates, greater system capacity, improved latency, and greater reliability, among other benefits.

FIG. 1 shows an example wireless communications system 100 that supports a network slice feasibility assessment for a latency-based SLA. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a RAN node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support a network slice feasibility assessment for a latency-based SLA as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other implementations, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other implementations, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be in accordance with a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (such as a communication link 125, a D2D communication link 135). HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, for which the device may provide HARQ feedback in a specific slot for data received via a previous symbol in the slot. In some other implementations, the device may provide HARQ feedback in a subsequent slot, or according to some other time interval.

In some aspects, the wireless communications system 100 may support one or more signaling- or configuration-based mechanisms associated with network slice management. For example, the wireless communications system 100 may support one or multiple network slices and may dynamically (such as in an on-demand manner) add new network slices in accordance with a resource availability within the wireless communications system 100. In some implementations, one or more devices, components, entities, or functionalities of the wireless communications system 100 (such as a network entity 105, or any one or more components, entities, or functionalities of a network entity 105) may support an automated slice feasibility assessment, as part of RAN orchestration, according to which a requested network slice may be approved (such as admitted and implemented) or rejected.

In some implementations, one or more devices, components, entities, or functionalities associated with (such as part of) a network platform may perform operations of the automated slice feasibility assessment. Additionally, or alternatively, automated slice configuration capabilities may be included in the network platform. In some implementations, the network automation may support slice configuration capabilities associated with NSSMF representational state transfer (REST) application programming interface (API) support, a feasibility check and resource allocation procedure, a programmable policy associated with an MNO design, or any combination thereof.

In some aspects, NSSMF REST API support may include or be associated with life cycle management (LCM) supported actions of "allocate/active" through to "deactivate/delete" and status updates associated with different operations. A feasibility check and resource allocation procedure may include or be associated with a vendor agnostic calculation procedure and feasibility evaluation results that are in accordance with a comparison of measured versus projected resource (such as PRB) utilization. A programmable policy associated with an MNO design may include or be associated with a programmability engine for provisioning, which may translate an MNO policy into RAN parameters. As such, in accordance with the example implementations described herein, one or more devices, components, entities, or functionalities of the wireless communications system 100 may implement an automated slice feasibility assessment in a dynamic and on-demand manner, which may satisfy one or more latency targets, throughput targets, or some combination thereof associated with an SLA for a network slice request, facilitate greater data rates and higher reliability, and support greater spectral efficiency, among other benefits.

Figure 2:
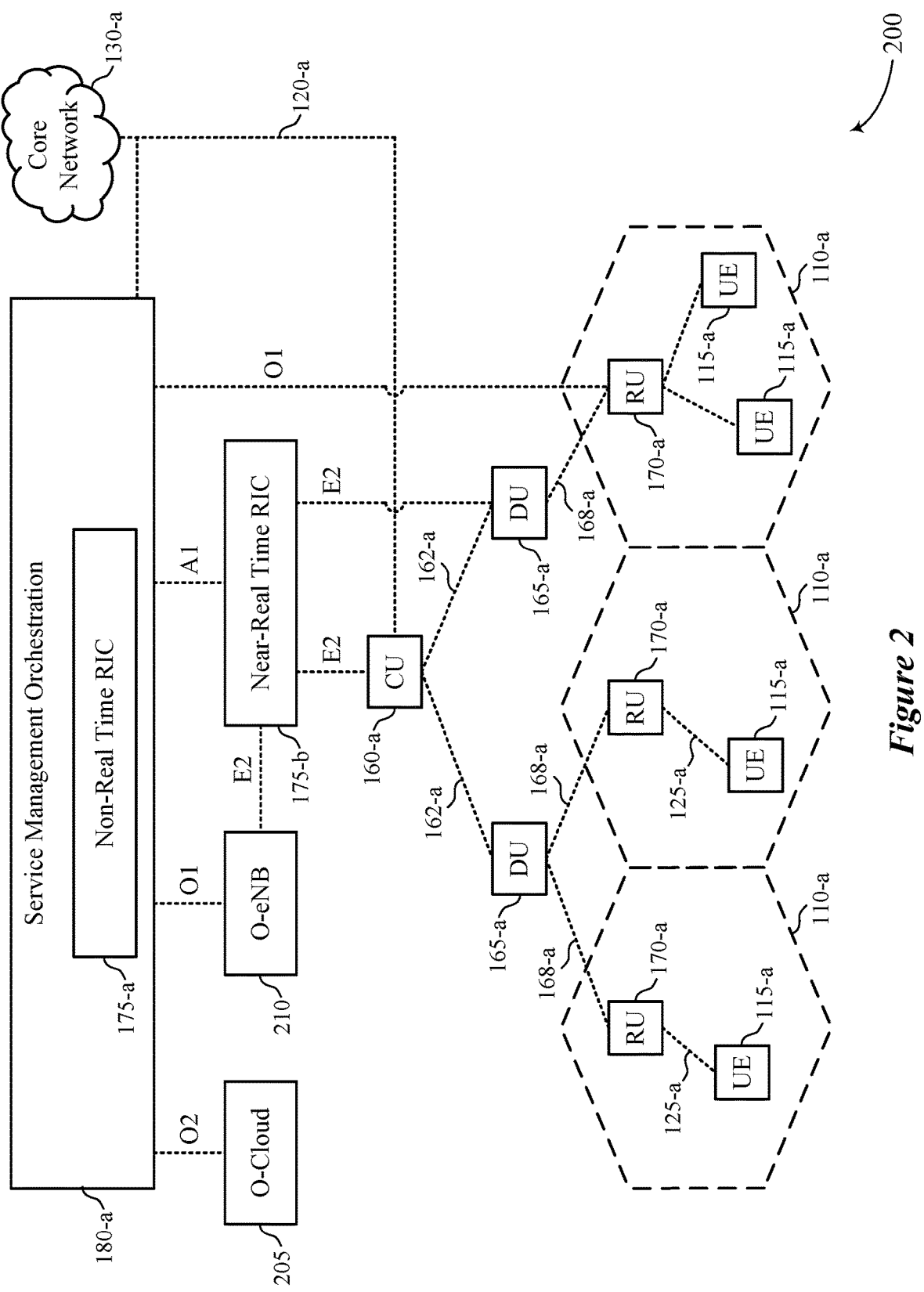
FIGS. 2 and 3 show example network architectures that support a network slice feasibility assessment for a latency-based SLA.

FIG. 2 shows an example network architecture 200 that supports a network slice feasibility assessment for a latency-based SLA. The network architecture 200 may be an example of a disaggregated BS architecture or a disaggregated RAN architecture. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (such as a Near-RT RIC 175-b via an E2 link, or a Non-RT RIC 175-a associated with an SMO 180-a (such as an SMO Framework), or both). A CU 160-a may communicate with one or more DUs 165-a via respective midhaul communication links 162-a (such as an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (such as CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (such as data, information) via a wired or wireless transmission medium. Each network entity 105, or an associated processor (such as controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (such as an RF transceiver) configured to receive or transmit signals, or both, over a wireless transmission medium to one or more of the other network entities 105.

In some implementations, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (such as CU-UP), control plane functionality (such as CU-CP), or a combination thereof. In some implementations, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (such as BS functions, RAN functions) to control the operation of one or more RUs 170-a. In some implementations, a DU 165-a may host, at least partially, one or more of an RLC layer, a MAC layer, and one or more aspects of a PHY layer (such as a high PHY layer, such as modules for FEC encoding and decoding, scrambling, modulation and demodulation, or the like) depending, at least in part, on a functional split, such as those defined by the 3rd Generation Partnership Project (3GPP). In some implementations, a DU 165-a may further host one or more low PHY layers. Each layer may be implemented with an interface configured to communicate signals with other layers hosted by the DU 165-a, or with control functions hosted by a CU 160-a.

In some implementations, lower-layer functionality may be implemented by one or more RUs 170-a. For example, an RU 170-a, controlled by a DU 165-a, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, in accordance with the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some implementations, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (such as an O1 interface). For virtualized network entities 105, the SMO 180-a may be configured to interact with a cloud computing platform (such as an O-Cloud 205) to perform network entity life cycle management (such as to instantiate virtualized network entities 105) via a cloud computing platform interface (such as an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (such as via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, AI or ML workflows including model training and updates, or policy-based guidance of applications/features in the Near-RT RIC 175-b. The Non-RT RIC 175-a may be coupled to or communicate with (such as via an A1 interface) the Near-RT RIC 175-b. The Near-RT RIC 175-b may be configured to include a logical function that enables near-real-time control and optimization of RAN elements and resources via data collection and actions over an interface (such as via an E2 interface) connecting one or more CUs 160-a, one or more DUs 165-a, or both, as well as an O-eNB 210, with the Near-RT RIC 175-b.

In some implementations, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some implementations, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (such as reconfiguration via 01) or via generation of RAN management policies (such as A1 policies).

In accordance with the example implementations disclosed herein, one or more devices, components, entities, or functionalities of the network architecture 200 may support a resource prediction (such as a cell-by-cell resource prediction) of a requested network slice in accordance with a latency threshold of an SLA associated with the requested network slice and, in some implementations, observed network conditions at each cell or across various groups of cells of a set of cells within a requested slice coverage area. In accordance with obtaining the resource prediction (such as a PRB allocation), the resource prediction may be stored and added on top of a current (actual) resource utilization at each of the cells within the envisioned slice coverage area. A scanning operation may indicate which cells or which group of cells within the envisioned slice coverage area are able to accommodate a respective predicted resource allocation in addition to a respective current cell load. In accordance with (such as with reference to) a slice admission policy, the requested network slice may be approved for admission or rejected in accordance with how many (such as what percentage of) cells are able to accommodate the requested network slice, how many (such as what percentage of) intended users are able to be served in accordance with the requested network slice, or both.

Figure 3:
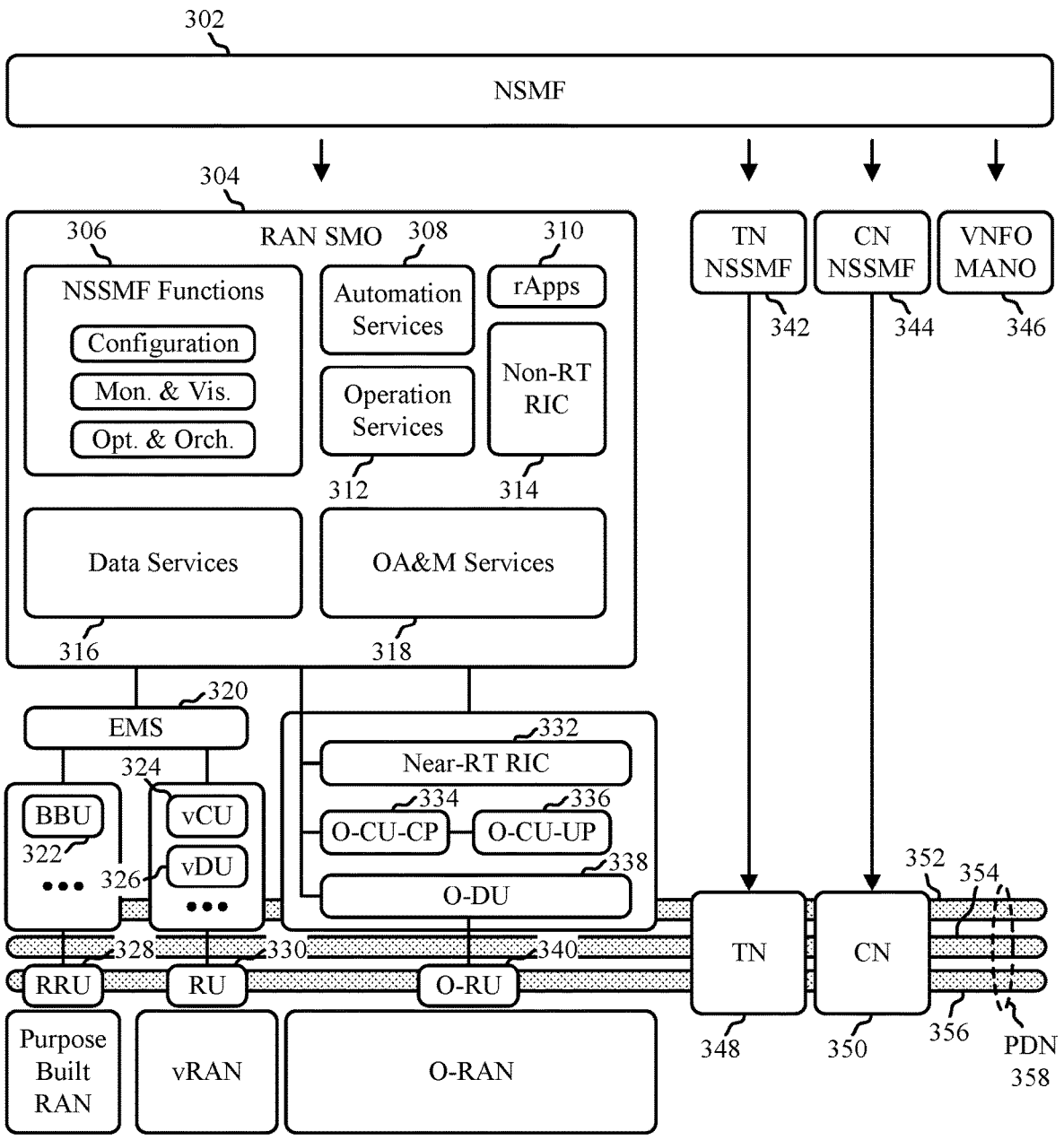

FIG. 3 shows an example network architecture 300 that supports a network slice feasibility assessment for a latency-based SLA. The network architecture 300, which may illustrate a RAN NSSMF architecture, may be associated with end-to-end (E2E) management and orchestration of network slicing. For example, the network architecture 300 may be associated with 5G standalone (SA) slicing E2E management and orchestration and may support network slicing in different types of RAN deployments, including O-RAN and non-O-RAN deployments.

The network architecture 300 may include or be supported by various devices, components, entities, or functionalities, including an NSMF 302 and an SMO 304 (which may interface with one or more open APIs). The SMO 304 may include one or more NSSMF functions 306. An NSSMF (which may be understood as a RAN NSSMF, or R-NSSMF) may include or be associated with vendor agnostic automated slice design, creation, monitoring, and optimization. The NSSMF may have a "northbound" interface towards the NSMF 302. The NSSMF functions 306 may include a slice configuration function, a slice monitoring and visualization function (abbreviated Mon. & Vis. in the example illustration of FIG. 3), and a slice optimization and orchestration function (abbreviated Opt. & Orch. in the example illustration of FIG. 3).

The NSSMF functions 306 may further be associated with a slice manager, which may perform operations associated with an integrity service and a monitoring service. For example, the slice manager may propagate slice states to the NSMF 302, expose slicing APIs (such as to create, modify, or deactivate), and instantiate integrity service upon slice configuration. An integrity service may support a short cycle integrity check (in accordance with augmented cell data), a live network tracker (in accordance with observing whether cells within a slice were changed), and a long cycle integrity check (in accordance with daily slice policy enforcement). A monitoring service may keep track of an activated slice SLA and, if an SLA is not met, raise (such as trigger) an event to be treated by a suitable application.

A slice configuration function may include or be associated with automated new slice configuration and existing slice reconfiguration for multiple virtualized RAN (vRAN) vendors' gNB over a traditional or vRAN element management system (EMS), or over an O1 interface in examples of O-RAN deployments. A slice monitoring and visualization function may include or be associated with monitoring slice SLA key performance indicators (KPIs) according to slice profile attributes (such as latency, throughput, delay, reliability, availability, mobility, activity, or traffic) on a cell or cluster level. In scenarios of predicted violation, the slice monitoring and visualization function may trigger a slice optimization. A slice optimization and orchestration function may include or be associated with event trigger context-based closed-loop optimization for a relevant cell or cluster and resolving SLA violations generated by an SLA monitoring service.

The SMO 304 may further include or be associated with automation services 308, RAN apps (rApps) 310 (which may include a slice feasibility rApp, a configuration rApp, or a generic n rApp), operation services 312, a non-real time (RT) RAN intelligent controller (RIC) 314, data services 316, and operations, administration, and maintenance (OA&M) services 318. The SMO 304 may further be associated with one or more operational policies, a recipe service, and a contextual service. The data services 316 and the OA&M services 318 may collectively include or be associated with (such as have exposure to via an API) RAN data exposure, RAN data abstraction, a provisioning gateway, an inventory, a network manager, a network function orchestrator (NFO) interoperability (which may be associated with an NFO component to which the SMO 304 may have exposure via an API), performance management (PM), configuration management (CM), fault management (FM), and trace management. The SMO 304 may include an API gateway or a message bus via which one or more rApps 310 and other services of the SMO 304 (such as the NSSMF functions 306 and the non-RT RIC 314) may communicate.

The SMO 304 may communicate with an EMS 320, which may be associated with two different branches including a first branch associated with a purpose-built RAN and a second branch associated with a vRAN. The first branch may be associated with a baseband unit (BBU) 322 and potentially additional hardware coupled with a remote radio unit (RRU) 328. The RRU 328 may provide access to the purpose-built RAN, which may be associated with 3G through to 5G deployments and beyond. The second branch may be associated with a virtualized CU (vCU) 324 and a virtualized DU (vDU) 326 and potentially additional hardware coupled with an RU 330. The RU 330 may provide access to the vRAN, which may be associated with 4G, 5G, and 6G deployments.

The SMO 304 may further communicate with one or more O-RAN network functions including a near-RT RIC 332, an O-RAN CU control plan (O-CU-CP) 334, an O-RAN CU user plane (O-CU-UP) 336, and an O-RAN DU (O-DU) 338. The O-RAN network functions may communicate with an O-RAN RU (O-RU) 340 which may provide access to the O-RAN, which may alternatively be referred to or understood as an open cloud (O-Cloud), and which may be associated with 4G, 5G, and 6G deployments. In some aspects, the SMO 304 may interface with the near-RT RIC 332, the O-CU-CP 334, and the O-DU via an O1 interface. Additionally, or alternatively, the SMO 304 may interface with the near-RT RIC 332 via an A1 interface. The near-RT RIC 332 may interface with each of the O-CU-CP 334 and the O-CU-UP 336 via E2 interfaces, and the O-CU-CP 334 may interface with the O-CU-UP 336 via an E1 interface. The O-CU-CP 334 may interface with the O-DU 338 via either or both of an E2 interface or an F1-C interface, and the O-CU-UP may interface with the O-DU 338 via an F1-U interface. The O-DU 338 may interface with the O-RU 340 via an open fronthaul.

The network architecture 300 may further be associated with a transport network (TN) NSSMF 342 interfacing or otherwise associated with a TN 348 (for fronthaul, midhaul, and backhaul communication) and a core network (CN) NSSMF 344 interfacing or otherwise associated with a CN 350 (for user plane function (UPF) and session management function (SMF) communication). The network architecture 300 may further be associated with a virtualized network function orchestration (VNFO) management and orchestration (MANO) 346. In some aspects, the network architecture 300 may support one or more types of network slices, including a massive machine type communication (mMTC) slice 352, an enhanced mobile broadband (eMBB) slice 354, and a URLLC or V2X slice 356, each of which may be associated with a packet data network 358.

In some deployment scenarios, several challenges associated with RAN slicing by an MNO may arise. For example, RAN slicing and configuring multiple slice types deployed across multiple RAN vendors and frameworks (such as traditional RAN frameworks, vRAN frameworks, and O-RAN frameworks) may introduce high complexity. Further, a slice configuration process in various geographical areas, in various multi-band or multi-frequency deployments, using different slice parameters, and supporting a high degree of slice customization may add to such complexity and may further contribute meaningfully to a latency in a determination of slice feasibility. Additionally, monitoring, managing, or supporting slice SLA fulfillment in a multi-slice environment may introduce further complexities as networks plan to support a relatively large quantity of slices.

Further, challenges may arise in association with an expectation for approval of a slice request sent by the NSMF 302 (an E2E orchestrator). The slice request can be of different types, including eMBB, URLLC, or mMTC and each could have different SLA constraints. For example, a slice request may be associated with a network slice configured to support gaming operations. Such a network slice may include SLA characteristics that support gaming, such as a downlink throughput threshold latency, an uplink throughput threshold latency, or both to satisfy latency thresholds for gaming. In some implementations, this network slice may be an example of a URLLC (such as a latency-sensitive) network slice, corresponding to a specific service slice type (SST). For example, the URLLC network slice may have an SST value of 2. To handle a network slice request associated with a URLLC network slice, the NSSMF may consider a latency domain of the slice SLA to determine whether to accept or reject the requested network slice. In some aspects, the latency associated with communications for a network slice may involve air interface latency, backhaul latency, or both. The air interface latency may vary according to a quantity of users communicating within the network slice, a quantity of resources (such as PRBs) allocated for the communications, or both. Accordingly, the NSSMF may satisfy the latency threshold for a network slice request by modifying the quantity of resources allocated to the network slice (such as for a given quantity of users operating within the slice). In some implementations, the NSSMF may affect the air interface latency (such as by changing the quantity of resources allocated to the network slice) but may not affect the backhaul latency.

Once a request is made, a RAN NSSMF (which may be a RAN domain orchestrator) may determine, measure, identify, or ascertain whether there is enough capacity, coverage, and resources in an envisioned slice coverage area. For example, the RAN NSSMF may perform a slice feasibility assessment for the specific network parameters of the envisioned slice coverage area. The network parameters may include load information, RF conditions, traffic patterns, the network infrastructure (such as the physical locations of cells and cell coverage areas), or any combination of these or other parameters. The load information may refer to a quantity of users supported by the network slice, a respective quantity of users per cell associated with the network slice, or otherwise the "load" of communications occurring within the network slice in accordance with a quantity of users. In some aspects, the load information may be a simulated value (such as a predicted quantity of users, a threshold quantity of users) or an observed value (such as a quantity of users operating within the envisioned slice coverage area during some previous time period). The slice feasibility assessment may assess if the envisioned slice coverage area can satisfy a latency threshold of the slice SLA (such as an uplink latency threshold, a downlink latency threshold, or both), a throughput threshold of the slice SLA (such as an uplink throughput threshold, a downlink throughput threshold, or both), or a combination of these or other SLA characteristics associated with a requested network slice. In some implementations, the latency threshold may be defined in terms of X milliseconds (ms) for sending or receiving data (such as data of a specific size). The RAN NSSMF performing the slice feasibility assessment may select (such as determine, predict, or otherwise ascertain) a quantity of PRBs for the requested network slice to satisfy the latency threshold. In some aspects, the RAN NSSMF may determine a relationship between resource allocation and latency for different frequency ranges, user traffic patterns, RF conditions, quantities of users (such as load information), or any combination thereof. The RAN NSSMF may use the relationship to select the quantity of PRBs to satisfy the specific latency threshold.

In some implementations, one or more devices, components, entities, or functions associated with the network architecture 300 may support an automated slice configuration process that leverages an ML/AI model to assist in the slice feasibility assessment. As part of such an automated slice configuration process, a new slice allocation request may be made by the NSMF 302 to the NSSMF, which may determine whether there are enough resources to accommodate the new slice allocation request (a URLLC slice allocation request). For example, the SMO 304, or a device that performs operations associated with the SMO 304 or the NSSMF, may receive a request for a network slice from the NSMF 302 and may trigger a series of applications (such as a series of rApps 310) to determine whether the requested network slice is feasible, and may output a recommendation associated with (such as an indication of an approval or rejection of) the requested network slice. In some aspects, such a series of applications may include a resource estimation application and a feasibility application, and the feasibility application may account for various inputs including an output of the ML/AI model (which may provide insight or information otherwise assistive to a determination of whether the requested network slice is to be approved or rejected). In accordance with determining whether the requested network slice is to be approved or rejected, the SMO 304 may output an indication of the approval or the rejection toward the NSMF 302 (such as via the NSSMF).

Figure 4:
FIG. 4 shows an example network framework that supports a network slice feasibility assessment for a latency-based SLA.

FIG. 4 shows an example network framework 400 that supports a network slice feasibility assessment for a latency-based SLA. The network framework 400 illustrates slicing applications on top of a data mediation layer (DML) to execute NSMF slice orders. The network framework 400 may include an NSMF E2E orchestrator 402 that communicates with a slice manager 404, which may include, be included within, or otherwise be associated with an NSSMF 406. The network framework 400 may further include a set of automation applications 408 (such as one or more automation applications 408) and a set of ecosystem tools 410 (such as one or more ecosystem tools 410).

The slice manager 404 (or the NSSMF 406) may communicate with a DML 418 via an API gateway 412. Similarly, the automation applications 408 may communicate with the DML 418 via the API gateway 412. The ecosystem tools 410 may communicate with a stateless mediation 416 via a message bus 414. The stateless mediation 416 and the DML 418 may communicate in accordance with a network deployment, and the DML 418 may communicate with one or more data producers 420. The data producers 420 may provision data to one or multiple different types of networks, including a single RAN (S-RAN) 422, a vRAN 424, or an O-RAN 426.

In some implementations, the network framework 400, or devices or components associated with the network framework 400, may be pluggable, scalable, abstractable, programmable, and compatible, which may facilitate realization of the example implementations of the present disclosure. For example, various devices, components, entities, functionalities, or applications associated with the network framework 400 may support an automated slice configuration process according to which a device associated with an SMO may obtain or receive a request for a network slice and output or transmit a recommendation associated with the requested network slice in accordance with ML/AI-assisted resource allocation predictions for the requested network slice. In some implementations, the automated slice configuration process may perform a slice feasibility assessment, for example, prior to deployment of a network slice. The slice feasibility assessment may determine whether a requested network slice is feasible (such as supported by the network architecture of cells) prior to configuration or activation of the network slice. In some implementations, the device may perform the ML/AI-assisted resource allocation predictions in accordance with a latency threshold associated with an SLA for the requested network slice, a throughput threshold associated with the SLA for the requested network slice, user information (such as one or more quantities of UEs to serve at one or more cells corresponding to the requested network slice), or any combination thereof. In some aspects, the user information may be referred to as load information for the network slice. The device associated with the SMO may further obtain or receive such load information for the network slice and may perform the ML/AI-assisted resource allocation predictions in accordance with the load information.

Figure 5:
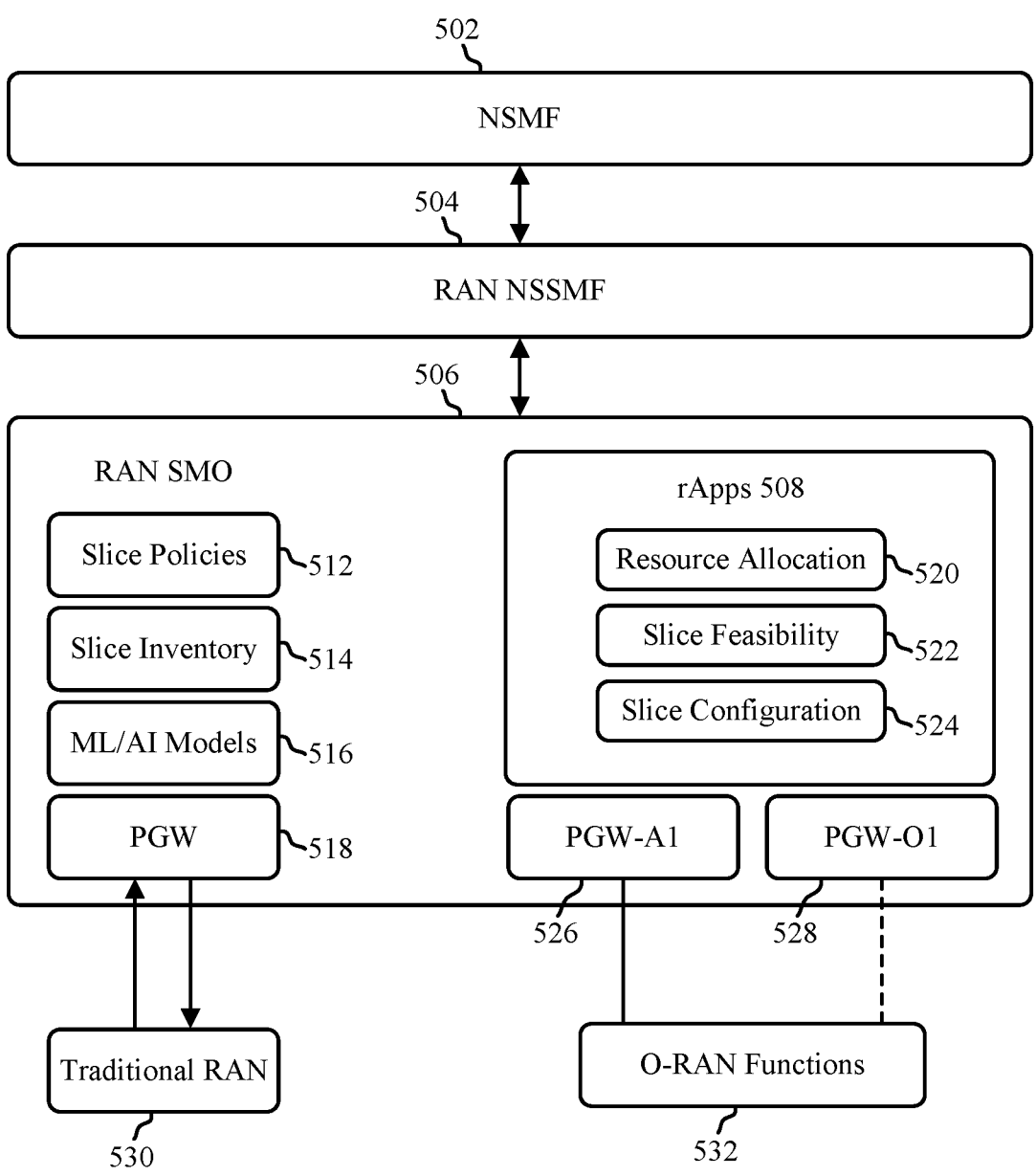
FIG. 5 shows an example network architecture that supports a network slice feasibility assessment for a latency-based SLA.

FIG. 5 shows an example network architecture 500 that supports a network slice feasibility assessment for a latency-based SLA. The network architecture 500 includes an NSMF 502, a NSSMF 504 (which may be understood as a RAN NSSMF, or R-NSSMF), and an SMO 506 (which may be understood as a RAN SMO). The NSMF 502 may interface with the NSSMF 504, which may in turn interface with the SMO 506. In some implementations, the network architecture 500 may illustrate a functional diagram via which a device associated with service management may perform the example implementations disclosed herein.

The SMO 506 may include or be associated with a set of (such as one or more) rApps 508. The rApps 508 may include a resource allocation application 520 (which may be understood or otherwise referred to as a resource estimation application), a slice feasibility application 522, a slice configuration application 524, or any combination thereof. The SMO 506 may further include or be associated with various other services, functions, or entities, and such various other services, functions, or entities may include slice policies 512, a slice inventory 514, ML/AI models 516, and a packet gateway (PGW) 518. In some aspects, the SMO 506 may further include or be associated with a PGW-A1 526 (a PGW associated with an A1 interface) and a PGW-O1 528 (a PGW associated with an O1 interface). The SMO 506 may interface with a traditional RAN 530 via the PGW 518 and may interface with one or more O-RAN functions 532 via one or both of the PGW-A1 526 or the PGW-O1. The traditional RAN 530 may be associated with an EMS 320 as illustrated by and described with reference to FIG. 3, and may refer to one or more of a purpose-built RAN, an S-RAN, or a vRAN. The O-RAN functions 532 may include one or more of an near-RT RIC 332, an O-CU-CP 334, an O-CU-UP 336, and an O-DU 338 as illustrated by and described with reference to FIG. 3.

In some implementations, one or more devices, components, entities, or functions associated with the network architecture 500 may support or otherwise facilitate an automated slice configuration process according to which a recommendation associated with a requested network slice may be provided in an on-demand manner. For example, a device associated with service management of a wireless network (such as a device housing or otherwise associated with a functionality of one or both of the NSSMF 504 or the SMO 506) may output a recommendation associated with a requested network slice in accordance with one or more of an SLA associated with the requested network slice, observed network conditions, current cell loads, a traffic forecast, or a slice admission policy, among other examples. In some implementations, the device associated with the service management may use one or more ML/AI models 516 to assist in a predicted resource allocation of the requested network slice (such as on a cell-by-cell basis) or to assist with an outputting of (such as a determination of) the recommendation, such one or more ML/AI models 516 being trained in accordance with observed network conditions, a set of (such as one or more) network snapshots, live network statistics, or any combination thereof.

For example, the device may train an ML/AI model 516 in accordance with different types of networks with different types of cells. In the training, each cell may be associated with (such as hold) a unique RF distribution pattern and different cell physical data (such as different cell physical characteristics, which may include a cell height, a sight distance, a distance between cell sites, or an antenna configuration). Additionally, or alternatively, the device may train the ML/AI model 516 considering different slice natures, a slice nature corresponding to, for example, indoor stationary, outdoor stationary, indoor-outdoor mix stationary (according to which there may be some distribution of indoor devices and outdoor devices), or V2X moving/ mobile located on roads. In accordance with such training, the device may achieve more accurate cell modeling (which may be used as a baseline to calculate predicted PRB allocations for a requested network slice). Additionally, or alternatively, the device may train the ML/AI model 516 using different bands and frequencies, different morphologies, different types of SLA requests (coming from the NSMF 502), different latency thresholds for the SLA, different throughput thresholds for the SLA, different load information (such as different quantities of UEs 115 operating within the cell coverage areas), or any combination thereof. As such, the ML/AI engine may use (such as consider or reference) different bands and frequencies and different morphologies when selecting or otherwise determining an approval or a rejection of a requested network slice.

In accordance with some implementations, the device associated with the service management may perform a series of operations or trigger a series of applications, or any combination thereof, in response to receiving a request for a network slice. For example, the NSMF 502 may indicate (such as output or transmit) a request for a network slice to the NSSMF 504. The request may include or be associated with an SLA of the requested network slice. For example, the request may indicate one or more parameters associated with the SLA of the requested network slice. Such one or more parameters may be indicative of a throughput expectation (such as one or more throughput thresholds), a latency constraint (such as one or more latency thresholds), a bit error rate, or a quantity of intended users (such as UEs 115) at each cell in an envisioned slice coverage area. Additionally, in some implementations, the one or more parameters may be indicative of a slice admission policy, such as an MNO slice admission policy. In some aspects, a throughput expectation may be associated with a guaranteed bit rate, which may be understood as a slice request minimum (downlink) throughput.

A requested network slice may be a new network slice or a modified version of an existing network slice. Further, a requested network slice may be any type of network slice, such as any type of URLLC network slice.

The NSSMF 504 may, in accordance with receiving the request, trigger the resource allocation application 520 in the SMO 506. In some implementations, the resource allocation application 520 may provide a resource allocation for the full network slice. In some other implementations, the resource allocation application 520 may provide a cell-by-cell resource estimation for the cells corresponding to the requested network slice. In some aspects, the resource allocation application 520 may employ (such as use) per cell planning, which may be understood as cell planning on a cell-by-cell basis. For example, the resource allocation application 520 may determine (such as identify, select, predict, or calculate) a spectrum portion (in terms of, for example, PRBs) that will likely satisfy the requested SLA in accordance with RF conditions (such as observed network conditions) at each of a set of cells within the envisioned slice coverage area. In other words, the resource allocation application 520 may provide a PRB estimation in accordance with traffic model analytics.

Accordingly, the resource allocation application 520 (which may be understood or otherwise referred to as a resource estimation application) may estimate a quantity of resources (in terms of communication resources, such as PRBs) that the requested network slice might consume to allow its implementation. In other words, the resource allocation application 520 may be associated with an ability or capability to predict a quantity of PRBs per cell or per group of cells for a requested SLA for different types of network slice requests, such as different types of network slice requests of SST=URLLC type. Such a URLLC type of slice may be associated with a latency threshold to support relatively low latency operations.

In some implementations, the resource allocation application 520 may allow a user to adjust one or more evaluation thresholds to network-specific performance and the resource allocation application 520 may include, be associated with, or otherwise have access to (such as via a wired or wireless interface) backlog data for calculation. Such evaluation thresholds, which may be understood as optimization parameters and may be associated with a slice admission policy, may include a backlog duration, a percentile threshold for RF measurement distribution, a minimum quantity of RF measurement samples, an allowed frequency list, a busy hour definition, or any combination thereof. In other words, an MNO may be asked, by the device associated with service management, information indicative of a user coverage percentile (such as percentage of users to be covered, which may relate to a threshold quantity of intended users), a percentile of cells out of the slice coverage area (such as a percentage of cells that are outside of the slice coverage area, which may relate to a threshold quantity of cells), and a safety margin definition associated with violating the slice (such as a maximum PRB utilization which is defined for a cell and compared against the allocated cell utilization (such as the actual measured utilization of the cell) and the predicted utilization of the new slice). The MNO may accordingly support different MNO slicing strategies. An MNO slicing strategy may be associated with different quantities or proportions of cells in the slice coverage area complying with the SLA, different quantities or proportions of users in the slice coverage area for which the slice complies with the SLA, different safety margins for maintaining the SLA for the slice, or any combination of these or other slicing strategy parameters.

In accordance with such resource estimation, the resource allocation application 520 may select or predict that a first cell (or each cell of a first group of cells) associated with relatively higher quality RF conditions, relatively lower load conditions, or both may likely use a first, smaller quantity of PRBs to suitably support the latency threshold of the SLA for the requested network slice and that a second cell (or each cell of a second group of cells) associated with relatively poorer quality RF conditions, relatively greater load conditions, or both may likely use a second, larger quantity of PRBs to suitably support the latency threshold of the SLA for the requested network slice. Additional details relating to such a variation in RF conditions, load conditions, or both across cells within an envisioned slice coverage area, and corresponding variations in PRB estimation, are illustrated by and described with reference to FIG. 6.

In some implementations, the SMO 506 may use a resource allocation ML/AI engine (such as one of more of the ML/AI models 516) to support the resource estimation for the requested network slice. In accordance with using such an ML/AI engine, the SMO 506 may input one or more parameters into the ML/AI engine and obtain, as an output of the ML/AI engine, an estimated PRB allocation (such as multiple estimated PRB allocations on a cell-by-cell basis). Such one or more parameters that the SMO 506 may input into the ML/AI engine may include a first set of one or more parameters associated with (such as that contribute to) network slice modeling and a second set of one or more parameters associated with the requested SLA. The first set of parameters associated with network slice modeling (such as per-cell modeling) may include parameters associated with RF conditions or parameters associated with PRB and load distributions, or both. For example, cell modeling may be associated with one or more of a frequency band, a duplexing mode (such as FDD or TDD), traffic behavior (such as indoor stationary, outdoor stationary, indoor-outdoor mix stationary, or V2X moving/mobile located on roads), an MCS, a rank indicator (RI), and a cell RF profile using various metrics such as channel quality indicator (CQI) statistics. As such, in some implementations, an MNO may be asked, by the device associated with service management, for inputs including band or frequency, traffic distribution (such as what percentage of intended users are indoors and what percentage of intended users are outdoor), and one or more RF profiles built in accordance with CQI.

The second set of parameters associated with the requested SLA may include a quantity of active and scheduled users per-slice (or per-cell, per-slice), a target bit error rate, slice profile (such as SLA) throughput and latency thresholds, or any combination thereof. The output of the ML/AI engine may include a quantity of PRBs for a requested network slice, per-cell, or per-group of cells for the requested network slice (or for multiple requested network slices). As such, there may be a delta PRB per cell, such that, at a given cell, a first network slice may be allocated a first quantity of PRBs, a second network slice may be allocated a second quantity of PRBs, and a third network slice may be allocated a third quantity of PRBs.

In some aspects, cell-by-cell resource estimation techniques may support a relatively more accurate estimation of per-cell PRB allocation. For example, in some other systems, an operator may use a single PRB allocation value for all cells, which may result in over-dimensioning or under-dimensioning of the spectrum. Over-dimensioning of the spectrum (which may be equivalently understood as resource over-estimation) may result in or otherwise increase the likelihood of spectrum loss or waste. In other words, over-dimensioning may generate false negatives (in terms of whether cells are able to accommodate a requested network slice), leading to network sub-utilization. Under-dimensioning of the spectrum (which may be equivalently understood as resource under-estimation) may result in or otherwise increase the likelihood of an SLA violation. In other words, under-dimensioning may generate false positives (in terms of whether cells are able to accommodate a requested network slice) in cells that may avoid (or otherwise be unable to guarantee) slice SLA fulfillment. For example, with under-dimensioning, an operator may violate an SLA (such as fail to satisfy a latency threshold) to customers in some conditions (such as under relatively high load conditions). As such, in accordance with the described cell-by-cell resource estimation techniques, the system may avoid spectrum loss and enterprise or customer slice violations, while also addressing complexities associated with selection of resource allocation settings in terms of isolation level (such as dedicated, prioritized, or shared).

The SMO 506 may obtain the resource estimation of the requested network slice, which may be understood or referred to as a respective PRB allocation of the network slice for each cell of a set of cells, as an output of the resource allocation application 520. In accordance with obtaining the cell-by-cell resource estimation, the SMO 506 may save the data associated with the cell-by-cell resource estimation in a database. For example, the SMO 506 may output the results of the resource allocation application 520 to a RAN resource inventory. In some implementations, the results may include cell-by-cell slice allocation scores in accordance with the cell-by-cell resource estimation.

The SMO 506 may trigger a slice feasibility check via the slice feasibility application 522. The slice feasibility application 522 may take a set of inputs and may output a recommendation associated with the requested network slice. In some implementations, the slice feasibility application 522 may transmit or output the recommendation associated with the requested network slice in accordance with the cell-by-cell resource estimation and a current cell-by-cell resource utilization, among other factors (such as traffic forecasting, a slice admission policy, and performance metrics, among other examples). In other words, for each of a set of cells within the envisioned slice coverage area, the slice feasibility application 522 may add a respective predicted PRB allocation to a respective current PRB utilization to calculate (such as determine or predict) a total quantity of PRBs that might be used (to support existing network slices and the requested network slice) at that cell. In accordance with the calculation of the total quantity of PRBs that might be used at each cell of the set of cells within the envisioned slice coverage area, the slice feasibility application 522 may scan across the set of cells, apply a slice admission policy, and output an approval or rejection of the requested network slice in accordance with the scan and the slice admission policy. In some implementations, the SMO 506 may transmit or output the indication of the approval or rejection of the requested network slice to the RAN resource inventory. Additionally, or alternatively, the slice feasibility application 522 may output (such as to the RAN resource inventory, to the NSMF 502) a feasibility indication for each cell of the set of cells corresponding to the requested network slice. For example, if the requested network slice is rejected, the slice feasibility application 522 may indicate which cells of the set of cells fail to support the requested network slice (such as failing to support the latency threshold for the SLA of the requested network slice).

Additionally, or alternatively, an approval or rejection of a requested network slice may be in accordance with a subset of cells of a larger set of cells if not in accordance with all input cells. For example, one or both of the resource allocation application 520 and the slice feasibility application 522 may take (such as receive, select, obtain, or otherwise determine) a quantity m of cells as inputs (such as inputs to, for example, train a machine learning model or as inputs to resource allocation and feasibility checks, or as inputs to both) and may output a decision on a quantity n of the m cells (n≤m, including examples in which n=1). Such an inputting of a first quantity m of cells and a providing of a decision (such as a recommendation, which may include an approval or a rejection) associated with a second quantity n of cells may be implemented in addition to, or as an alternative to, exact (such as 1:1) cell-by-cell processing. In other words, cell-by-cell resource estimation may include cell-by-cell resource estimation when an output quantity (such as n) of cells is a subset of an input quantity (such as m) of cells (such that n<m) or when the output quantity (such as n) of cells is equal to an input quantity (such as m) of cells (such that n=m). Generally, scenarios in which n=m may be understood as exact (such as 1:1) cell-by-cell processing, as a decision is provided for all of the input cells.

Such a decision for a subset of cells may relate to a recommendation associated with the requested network slice that is applicable to the subset of cells. In outputting a final recommendation associated with a requested network slice, the slice feasibility application 522 may consider (such as account for) one or more recommendations associated with cell-by-cell processing, one or more recommendations associated with processing one or more subsets of cells, or any combination thereof. Different subsets of cells, in examples in which cell-by-cell resource estimation is such that n<m, may include a same quantity of cells or may include different quantities of cells.

In some implementations, the slice feasibility application 522 may take, as an input, an output of an ML/AI model (such as one or more of the ML/AI models 516) that provides ML/AI augmented insights associated with whether the requested network slice is to be approved or rejected. In such implementations, the output of the ML/AI model may be associated with an auto-classification or a KPI prediction, or both.

The SMO 506 may output or otherwise provide an indication of the approval or the rejection of the requested network slice to the NSSMF 504. In examples in which the SMO 506 outputs an approval of the requested network slice (in accordance with the output of the slice feasibility application 522), the NSSMF 504 may deploy the requested network slice in a network slice subnet instance (NSSI), such as an existing NSSI. The NSSMF 504 may trigger the slice configuration application 524 in accordance with the approval of the requested network slice and the SMO 506 may provision the requested network slice accordingly. In association with the provisioning of the requested network slice, the NSSMF 504 may notify the NSMF 502 that the requested network slice was configured successfully. Additionally, or alternatively, the NSSMF 504 may perform resource reservation (such as in accordance with the resource allocation application 520 analysis) for a subsequent time period. For example, a vendor may schedule activating a network slice for a later time (such as to coincide with some event). The NSSMF 504 may reserve the PRB resources for the later time to satisfy the SLA thresholds for the scheduled activation of the network slice at this later time. However, these PRB resources may be reused (such as by other network slices, for other operations) before and after the time period corresponding to the resource reservation.

Alternatively, in examples in which the SMO 506 outputs a rejection of the requested network slice, the NSSMF 504 may notify the NSMF 502 that the requested network slice was rejected (and not configured). In some implementations, the NSSMF 504 may indicate to the NSMF 502 which cells failed the feasibility analysis. Upon notification, the NSMF 502 may transmit another request for another network slice. For example, the NSMF 502, the NSSMF 504, and the SMO 506 may iteratively and dynamically request and analyze multiple network slices (such as multiple SLAs) over time, which may satisfy one or more user expectations related to network responsiveness to network slice requests. Further, in accordance with the described techniques, the device associated with service management may support on-demand prediction of a quantity of PRBs for different types of cells using feasibility cell modeling for any type of slice URLLC SLA.

In accordance with deployment of the requested network slice in a wireless network (such as after approval or admission), an ML/AI model (of the ML/AI models 516) associated with outputting the recommendation associated with the requested network slice may learn (such as in accordance with receiving indications of) live network statistics, which the ML/AI model may use to increase an accuracy of the ML/AI model for a next network slice request. In some implementations, a device associated with service management may receive information indicative of one or more performance indicators (such as KPIs) associated with the deployed network slice and may update (such as refine or retrain) the ML/AI model in accordance with the performance indicator(s). For example, the device may receive information indicative of an actual PRB usage at each of a set of cells within a slice coverage area, compare the actual PRB usage with the predicted PRB usage, and update (such as refine or retrain) the ML/AI model in accordance with a delta between the actual PRB usage and the predicted PRB usage.

Figure 6:
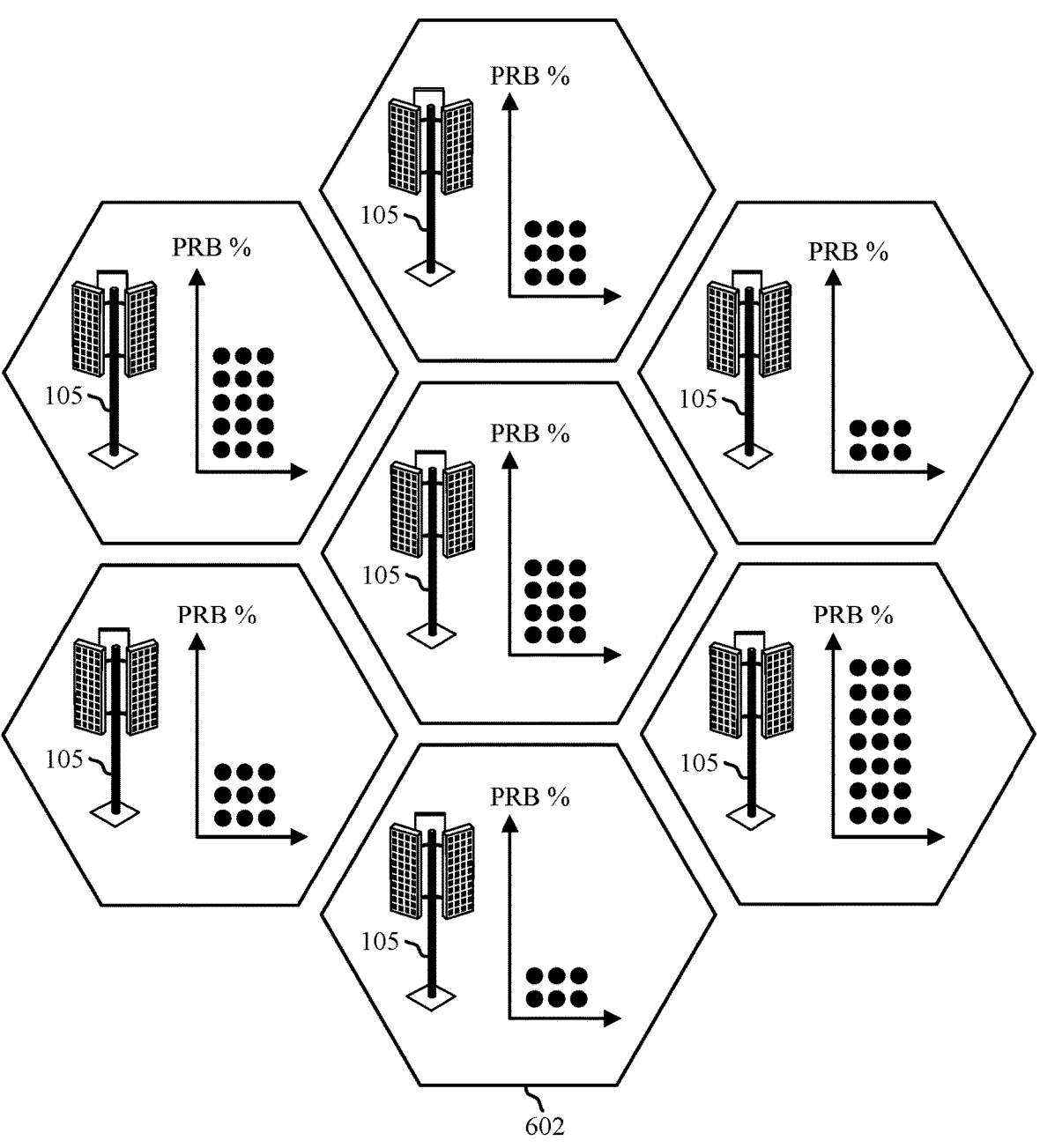
FIG. 6 shows an example slice coverage area that supports a network slice feasibility assessment for a latency-based SLA.

FIG. 6 shows an example slice coverage area 600 that supports a network slice feasibility assessment for a latency-based SLA. The slice coverage area 600 may include a set of cells and, in accordance with the example implementations disclosed herein, a resource allocation application 520 of an SMO 506 may select (such as determine or predict) a respective PRB allocation of a requested network slice for each cell of the set of cells in accordance with an SLA of the requested network slice. In some further implementations, the resource allocation application 520 may select (such as determine or predict) a respective PRB allocation of the requested network slice for each cell of the set of cells in accordance with the SLA and observed network conditions (such as observed network conditions at each of the set of cells).

For example, each cell of the set of cells may be associated with potentially unique network conditions (such as RF conditions), along with other unique factors or characteristics, and the resource allocation application 520 may account for such variability across the set of cells to select (such as determine or predict) a respective PRB allocation of the requested network slice for each cell of the set of cells. In other words, the resource allocation application 520 may recognize or otherwise consider that, to support a given latency per cell, throughput per cell, or both, different sized spectrum portions may be used if RF conditions differ. For example, if a first cell (or a first group of cells) is associated with relatively high quality RF conditions, the first cell (or the first group of cells) may use a relatively smaller quantity of PRBs to meet (such as satisfy) a given SLA (such as a latency-based SLA), which may inform the resource allocation application 520 to allocate the relatively smaller quantity of PRBs to the first cell (or the first group of cells) for the given SLA. For further example, if a second cell (or a second group of cells) is associated with relatively low quality RF conditions, the second cell (or the second group of cells) may use a relatively larger quantity of PRBs to meet (such as satisfy) the given SLA, which may inform the resource allocation application 520 to allocate the relatively larger quantity of PRBs to the second cell (or the second group of cells) for the given SLA.

Further, different cells within the slice coverage area 600 may be associated with different quantities of resources (in terms of a percentage of PRBs of available PRBs currently being used) or different signal-to-interference plus noise ratio (SINR) values, or both. In some implementations, the resource allocation application 520 may determine (such as select, calculate, or predict) cell-by-cell resource estimations of a requested network slice by considering or otherwise using such observed network conditions at each of the cells within the slice coverage area 600. In some aspects, the resource allocation application 520 may determine (such as select, calculate, or predict) the cell-by-cell resource estimations in accordance with cell-specific models, such as models being associated with (such as constructed in accordance with) the observed network conditions.

In the example of the slice coverage area 600, cells within the slice coverage area 600 are illustrated as network entities 105, although it is within the scope of the present disclosure that multiple cells may be located at a same network entity 105. As such, a cell within the slice coverage area 600 may at least include or be associated with a network entity 105. Likewise, a per-cell resource allocation (such as a per-cell PRB allocation) may be understood as a per-network entity 105 resource allocation (such as a per-network entity 105 PRB allocation). Each cell may be associated with a respective coverage area 602, which may encompass or serve one or more intended users (such as one or more UEs 115) associated with the requested network slice. In some aspects, a coverage area 602 may be an example of a coverage area 110 as illustrated by and described with reference to FIG. 1.

Figure 7:
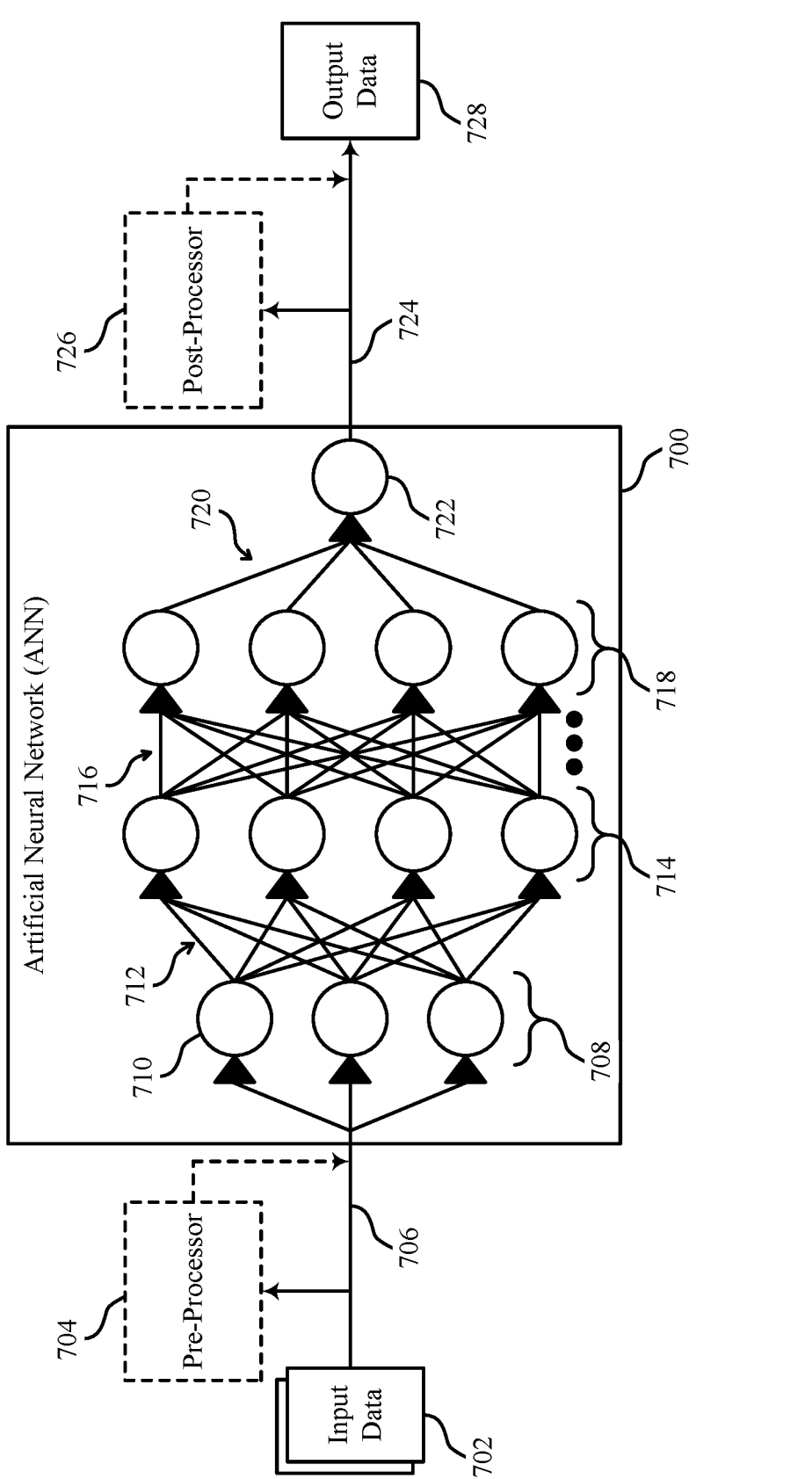
FIG. 7 shows a block diagram of an example machine learning (ML) model represented by an artificial neural network (ANN) that supports a network slice feasibility assessment for a latency-based SLA.

FIG. 7 shows a block diagram of an example ML model represented by an ANN 700 that supports a network slice feasibility assessment for a latency-based SLA. A device, such as a device associated with an NSSMF, an SMO, an NSMF, a network entity 105, or any combination thereof may include the ML model (such as the ANN 700). Certain aspects and techniques as described herein may be implemented, at least in part, using an AI program, such as a program that includes an ML model (such as the ANN 700 or any other type of ML model). An example ML model may include mathematical representations or define computing capabilities for making inferences from input data associated with patterns or relationships identified in the input data. As used herein, the term "inferences" can include one or more of decisions, predictions, determinations, or values which may represent outputs of the ML model. The computing capabilities may be defined in terms of certain parameters of the ML model, such as weights and biases. Weights may indicate relationships between certain input data and certain outputs of the ML model, and biases may be examples of offsets which may indicate a starting point for outputs of the ML model. An example ML model operating on input data may start at an initial output in accordance with the biases and update its output in accordance with a combination of the input data and the weights.

In some aspects, an ML model may be configured to provide computing capabilities for wireless communications. Such an ML model may be configured with weights and biases to perform PRB resource estimation (such as on a cell-by-cell basis) for a requested network slice, acceptance or rejection of a network slice (such as in accordance with a slice feasibility analysis), or any combination thereof. Thus, during operation of the device, the ML model may receive input data (per-cell data or per-slice data), such as network parameters associated with network snapshots, quantities of RRC users (such as UEs 115), quantities of scheduled users, quantities of desired users, PRB utilizations, CQI distributions, traffic patterns, one or more SLA throughput thresholds, one or more SLA latency thresholds, or any combination thereof. The input data may be received from cell telemetry, the requested network slice profile, or a combination thereof. The ML model may make inferences, such as a quantity of PRBs to support the requested network slice profile in accordance with the SLA thresholds given the network parameters, or an indication of an acceptance or a rejection of the network slice request, or both, associated with the weights and biases. The ML engine may be trained according to multiple (such as hundreds, thousands, or millions) of network snapshots including different RF conditions, different traffic patterns, and resulting latencies.

ML models may be deployed in one or more devices (such as network entities 105 and UEs 115) and may be configured to enhance various aspects of a wireless communications system 100. For example, an ML model may be trained to identify patterns or relationships in data corresponding to a network, a device, an air interface, or the like. An ML model may support operational decisions relating to one or more aspects associated with wireless communications devices, networks, or services. For example, an ML model may be utilized for supporting or improving aspects such as signal coding/decoding, network routing, energy conservation, transceiver circuitry controls, frequency synchronization, timing synchronization channel state estimation, channel equalization, channel state feedback, modulation, demodulation, device positioning, beamforming, load balancing, operations and management functions, security, or other functionality.

ML models may be characterized in terms of types of learning that generate specific types of learned models that perform specific types of tasks. For example, different types of machine learning include supervised learning, unsupervised learning, semi-supervised learning, reinforcement learning, among other types of learning. ML models may be used to perform different tasks such as classification or regression, where classification refers to determining one or more discrete output values from a set of predefined output values, and regression refers to determining continuous values which are not bounded by predefined output values. For example, a classification ML model configured according to aspects of this disclosure may produce an output which includes acceptance of rejection of a requested network slice. A regression ML model configured as described herein may produce an output which includes a quantity of PRBs to use for the requested network slice (such as per-cell). Some example ML models configured for performing such tasks include ANNs such as convolutional neural networks (CNNs) and recurrent neural networks (RNNs), transformers, diffusion models, regression analysis models (such as statistical models), large language models (LLMs), decision tree learning (such as predictive models), support vector networks (SVMs), and probabilistic graphical models (such as a Bayesian network), among other types of models.

The description herein illustrates, by way of some examples, how one or more tasks or problems in wireless communications may benefit from the application of one or more ML models to determine the feasibility of a network slice request more accurately and to improve resource allocation for the requested network slice. For example, an NSMF may more accurately select PRB allocations for cells of a network slice in accordance with a latency threshold of an SLA for the requested network slice. Such a selection of PRB allocations may improve resource utilization and communication reliability by reducing the likelihood or resource over- or under-allocation. Additionally, or alternatively, the NSMF may reduce processing resources associated with network slice configurations in accordance with one or more ML models indicating rejection of a requested network slice that is not feasible given the network infrastructure (such as the cells associated with the requested network slice).

To facilitate the discussion, an ML model configured using an ANN is used, but it should be understood, that other types of ML models may be used instead of an ANN. Hence, unless expressly recited, subject matter regarding an ML model is not necessarily intended to be limited to an ANN solution. Further, it should be understood that, unless otherwise specifically stated, terms such "AI/ML model," "ML model," "trained ML model," "ANN," "model," "algorithm," or the like are intended to be interchangeable.

The ANN 700 may receive input data 706 which may include one or more bits of data 702, pre-processed data output from a pre-processor 704 (optional), or some combination thereof. Here, the data 702 may include training data, verification data, application-related data, or the like, based, for example, on the stage of deployment of the ANN 700. The pre-processor 704 may be included within the ANN 700 in some other implementations. The pre-processor 704 may, for example, process all or a portion of the data 702 which may result in some of the data 702 being changed, replaced, or deleted. In some implementations, the pre-processor 704 may add additional data to the data 702. In some implementations, the pre-processor 704 may be another ML model, such as an ANN.

In some implementations, the ANN 700 may use network snapshots to train the ANN 700. For example, a wireless communications system 100 may generate a training set of data from storing historic network parameters (such as cell telemetry) and resulting latency values. Additionally, or alternatively, the ANN 700 may use data from simulations that simulate network parameters and resulting latency values. A device may train the weights of the ANN 700 using the generated training set. Additionally, or alternatively, the device may re-train or otherwise tune the weights of the ANN 700 in accordance with new network snapshots, simulations, or both.

ANN 700 includes at least one first layer 708 of artificial neurons 710 to process the input data 706 and provide resulting first layer data via connections or "edges" such as edges 712 to at least a portion of at least one second layer 714. The second layer 714 processes data received via edges 712 and provides second layer output data via edges 716 to at least a portion of at least one third layer 718. The third layer 718 processes data received via edges 716 and provides third layer output data via edges 720 to at least a portion of a final layer 722 including one or more artificial neurons 710 to provide output data 724. All or part of the output data 724 may be further processed in some manner by a post-processor 726 (optional). Thus, in certain examples, the ANN 700 may provide output data 728 that is associated with output data 724, post-processed data output from the post-processor 726, or some combination thereof.

The structure and training of the artificial neurons 710 in the various layers may be tailored to specific requirements of an application. Within a given layer, such as the first layer 708, the second layer 714, or the third layer 718 of the ANN 700, some or all of the neurons may be configured to process information provided to the layer and output corresponding transformed information from the layer. For example, transformed information from a layer may represent a weighted sum of the input information associated with a non-linear activation function or other activation function used to "activate" artificial neurons of a next layer. Artificial neurons in such a layer may be activated by or be responsive to parameters such as the previously described weights and biases of the ANN 700. The weights and biases of the ANN 700 may be adjusted during a training process or during operation of the ANN 700. The weights of the various artificial neurons may control a strength of connections between layers or artificial neurons, while the biases may control a direction of connections between the layers or artificial neurons. An activation function may select or determine whether an artificial neuron transmits its output to the next layer or not in response to its received data.

Different activation functions may be used to model different types of non-linear relationships. By introducing non-linearity into an ML model, an activation function allows the configuration for the ML model to change in response to identifying or detecting complex patterns and relationships in the input data 706. Some non-exhaustive example activation functions include a sigmoid based activation function, a hyperbolic tangent (tanh) based activation function, a convolutional activation function, up-sampling, pooling, and a rectified linear unit (ReLU) based activation function.

Training of an ML model, such as the ANN 700, may be conducted using training data. Training data may include one or more datasets which the ANN 700 may use to identify patterns or relationships. Training data may represent various types of information, including written, visual, audio, environmental context, operational properties, or other types of information. For example, the training data may include one or more counters relating to latency measurements, state, quantities of RRC users, MCS values, PRB load information, or any combination of these or other counters or training data. During training, the parameters (such as the weights and biases) of the artificial neurons 710 may be changed, such as to minimize or otherwise reduce a loss function or a cost function. A training process may be repeated multiple times to fine-tune the ANN 700 with each iteration.

The ANN 700 or other ML models may be implemented in various types of processing circuits along with memory and applicable instructions therein. For example, general-purpose hardware circuits, such as one or more central processing units (CPUs), one or more graphics processing units (GPUs), or suitable combinations thereof, may be employed to implement a model. In some implementations, one or more tensor processing units (TPUs), neural processing units (NPUs), or other special-purpose processors, field-programmable gate arrays (FPGAs), application-specific integrated circuits (ASICs), or the like also may be employed.

In example aspects, an ML model may be trained prior to, or at some point following, operation of the ML model, such as the ANN 700. When training the ML model, information in the form of applicable training data may be gathered or otherwise created for use in training an ANN accordingly. For example, training data may be gathered or otherwise created regarding information associated with received/transmitted signal strengths, interference, and resource usage data, as well as any other relevant data that might be useful for training a model to address one or more problems or issues in a communication system. In some implementations, all or part of the training data may originate at a UE 115 or other device in a wireless communications system, or one or more network entities 105, or aggregated from multiple sources (such as a UE 115 and a network entity 105, one or more other UEs 115, the Internet, or the like). In some other implementations, training data may be generated or collected online, offline, or both online and offline by a UE 115, a network entity 105, or other device(s), and all or part of such training data may be transferred or shared (in real or near-real time), such as through store and forward functions or the like.

Once an ANN has been configured by setting parameters, including weights and biases, from training data, the ANN's performance may be evaluated. In some scenarios, evaluation/verification tests may use a validation dataset, which may include data not in the training data, to compare the model's performance to baseline or other benchmark information. The ANN configuration may be further refined, for example, by changing its architecture, re-training it on the data, or using different optimization techniques.

In some implementations, one or more devices or services may support processes relating to an ML model's usage, maintenance, activation, reporting, or the like. In some aspects, all or part of a dataset or model may be shared across multiple devices, to provide or otherwise augment or improve processing. In some implementations, signaling mechanisms may be utilized at various nodes of a wireless network to signal the capabilities for performing specific functions related to the ML model, support for specific ML models, capabilities for gathering, creating, and transmitting training data, or other ML related capabilities. ML models in wireless communications systems may, for example, be employed to support decisions or improve performance relating to wireless resource allocation or selection, wireless channel condition estimation, interference mitigation, beam management, positioning accuracy, energy savings, or the like. In some implementations, model deployment may occur jointly or separately at various network levels, such as a UE 115, a network entity 105 such as a BS, or a disaggregated network entity 105 such as a CU, a DU, or an RU.

Figure 8:
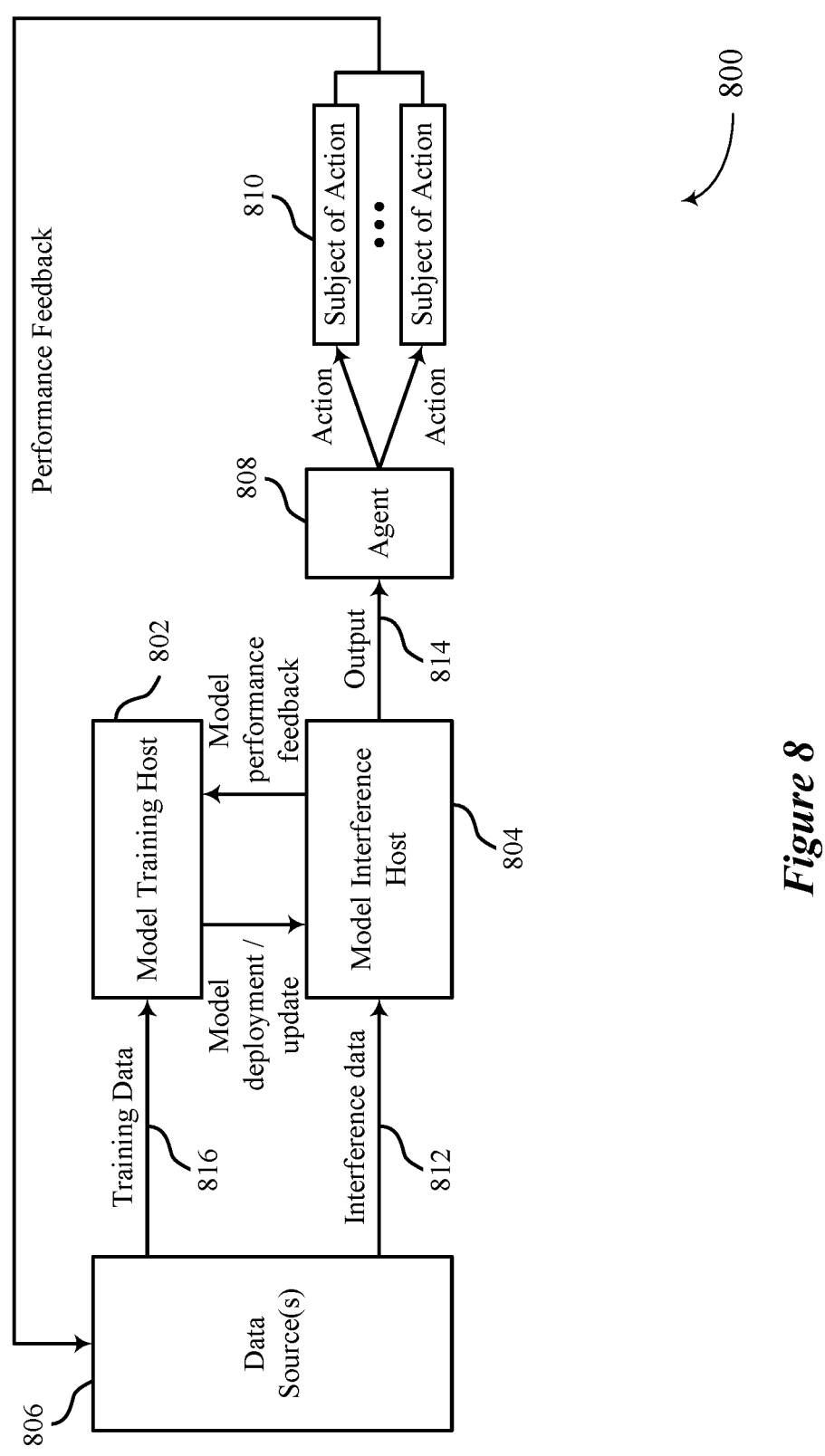
FIG. 8 shows a block diagram of an example ML architecture that supports a network slice feasibility assessment for a latency-based SLA.

FIG. 8 shows a block diagram of an example ML architecture 800 that supports a network slice feasibility assessment for a latency-based SLA. As illustrated, the ML architecture 800 includes multiple logical entities, such as a model training host 802, a model inference host 804, data source(s) 806, and an agent 808. The model inference host 804 is configured to run an ML model associated with inference data 812 provided by the data source(s) 806. The model inference host 804 may produce output 814, which may include a prediction or inference, such as a discrete or continuous value associated with inference data 812, which may be provided as input to the agent 808.

The agent 808 may represent an element or an entity of a wireless communications system including, for example, a RAN, a network entity 105, an SMO, an NSSMF, an NSM, or any other entity. In some implementations, the agent 808 may be a type of agent that depends on the type of tasks performed by the model inference host 804, the type of inference data 812 provided to the model inference host 804, or the type of output 814 produced by the model inference host 804.

Data can be collected from data sources 806 and may be used as training data 816 for training an ML model or as inference data 812 for feeding an ML model inference operation. The data sources 806 may collect data from various subject of action 810 entities (such as network entities 105 or cells supporting one or more network slices) and provide the collected data to a model training host 802 for ML model training. The model training host 802 may be deployed at the same or a different entity than that in which the model inference host 804 is deployed. For example, in order to offload model training processing, which can impact the performance of the model inference host 804, the model training host 802 may be deployed at a model server.

FIG. 9 shows a block diagram of an example device 905 that supports a network slice feasibility assessment for a latency-based SLA. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, one or more antennas 915, at least one memory 925, code 930, and at least one processor 935. These components may be in electronic communication or otherwise coupled (such as operatively, communicatively, functionally, electronically, electrically) via one or more buses (such as a bus 940).

The transceiver 910 may support bi-directional communications via wired links, wireless links, or both as described herein. In some implementations, the transceiver 910 may include a wired transceiver and may communicate bi-directionally with another wired transceiver. Additionally, or alternatively, in some implementations, the transceiver 910 may include a wireless transceiver and may communicate bi-directionally with another wireless transceiver. In some implementations, the device 905 may include one or more antennas 915, which may be capable of transmitting or receiving wireless transmissions (such as concurrently). The transceiver 910 also may include a modem to modulate signals, to provide the modulated signals for transmission (such as by one or more antennas 915 or by a wired transmitter), to receive modulated signals (such as from one or more antennas 915 or from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations in accordance with received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (such as the at least one processor 935, the at least one memory 925, or both), may be included in a chip or chip assembly that is installed in the device 905. In some implementations, the transceiver 910 may be operable to support communications via one or more communications links (such as communication link(s) 125, backhaul communication link(s) 120, a midhaul communication link 162, a fronthaul communication link 168).

The at least one memory 925 may include random-access memory (RAM), read-only memory (ROM), or any combination thereof. The at least one memory 925 may store computer-readable, computer-executable, or processor-executable code, such as the code 930. The code 930 may include instructions that, when executed by one or more of the at least one processor 935, cause the device 905 to perform various functions described herein. The code 930 may be stored in a non-transitory computer-readable medium such as system memory or another type of memory. In some implementations, the code 930 may not be directly executable by a processor of the at least one processor 935 but may cause a computer (such as when compiled and executed) to perform functions described herein. In some implementations, the at least one memory 925 may include, among other things, a basic input/output (I/O) system (BIOS) which may control basic hardware or software operation such as the interaction with peripheral components or devices. In some implementations, the at least one processor 935 may include multiple processors and the at least one memory 925 may include multiple memories. One or more of the multiple processors may be coupled with one or more of the multiple memories which may, individually or collectively, be configured to perform various functions described herein (such as, part of a processing system, a memory system, or both).

The at least one processor 935 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the at least one processor 935 may be configured to operate a memory array using a memory controller. In some other implementations, a memory controller may be integrated into one or more of the at least one processor 935. The at least one processor 935 may be configured to execute computer-readable instructions stored in a memory (such as one or more of the at least one memory 925) to cause the device 905 to perform various functions (such as functions or tasks supporting network slice feasibility assessment for a latency-based SLA). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (such as one or more physical nodes and supporting software such as operating systems, virtual machines, or container instances) that may host the functions (such as by executing code 930) to perform the functions of the device 905. The at least one processor 935 may be any one or more suitable processors capable of executing scripts or instructions of one or more software programs stored in the device 905 (such as within one or more of the at least one memory 925). In some implementations, the at least one processor 935 may include multiple processors and the at least one memory 925 may include multiple memories. One or more of the multiple processors may be coupled with one or more of the multiple memories, which may, individually or collectively, be configured to perform various functions herein.

In some implementations, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. For example, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some implementations, a processing system of the device 905 may refer to a system including the various other components or subcomponents of the device 905, such as the at least one processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

The device 905 may include one or more chips, SoCs, chipsets, packages or devices that individually or collectively constitute or include a processing system. The processing system includes processor (or "processing") circuitry in the form of one or multiple processors, microprocessors, processing units (such as CPUs, GPUs, or DSPs), processing blocks, ASIC, programmable logic devices (such as FPGAs), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as RAM or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G, or 6G compliant)

modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains, or transceivers.

In some implementations, a bus 940 may support communications of (such as within) a protocol layer of a protocol stack. In some implementations, a bus 940 may support communications associated with a logical channel of a protocol stack (such as between protocol layers of a protocol stack), which may include communications performed within a component of the device 905, or between different components of the device 905 that may be co-located or located in different locations (such as where the device 905 may refer to a system in which one or more of the communications manager 920, the transceiver 910, the at least one memory 925, the code 930, and the at least one processor 935 may be located in one of the different components or divided between different components).

In some implementations, the communications manager 920 may manage aspects of communications with a core network 130 (such as via one or more wired or wireless backhaul links). For example, the communications manager 920 may manage the transfer of data communications for client devices, such as one or more UEs 115. In some implementations, the communications manager 920 may manage communications with one or more other network entities 105, and may include a controller or scheduler for controlling communications with UEs 115 (such as in cooperation with the one or more other network devices). In some implementations, the communications manager 920 may support an X2 interface within an LTE/LTE-A wireless communications network technology to provide communication between network entities 105.

The communications manager 920 may support service management of a wireless network, in accordance with examples as disclosed herein. For example, the communications manager 920 is capable of, configured to, or operable to support a means for receiving or otherwise obtaining a request associated with a network slice of the wireless network, the request indicating a latency threshold associated with an SLA of the network slice. The communications manager 920 is capable of, configured to, or operable to support a means for receiving or otherwise obtaining load information associated with the network slice of the wireless network. The load information may include information relating to a quantity of users (such as UEs 115) operating within a coverage area of the requested network slice. The communications manager 920 is capable of, configured to, or operable to support a means for selecting, in accordance with the latency threshold and the load information, a PRB allocation for the network slice. The communications manager 920 is capable of, configured to, or operable to support a means for transmitting or otherwise outputting, to an NSMF and in accordance with the PRB allocation for the network slice, an indication of an acceptance or a rejection of the request associated with the network slice.

In some implementations, the request associated with the network slice further indicates a throughput threshold associated with the SLA of the network slice. In some implementations, the PRB allocation for the network slice is selected further in accordance with the throughput threshold.

In some implementations, the request associated with the network slice is received or otherwise obtained from the NSMF.

In some implementations, the communications manager 920 is capable of, configured to, or operable to support a means for selecting, in accordance with the PRB allocation for the network slice, a respective PRB allocation of the network slice for each cell of a set of cells of the wireless network associated with the network slice, where the indication of the acceptance or the rejection of the request associated with the network slice is in accordance with a respective PRB utilization at each cell of the set of cells and the respective PRB allocation of the network slice for each cell of the set of cells.

In some implementations, the communications manager 920 is capable of, configured to, or operable to support a means for outputting an indication of the respective PRB allocation of the network slice for each cell of the set of cells. In some implementations, the indication of the acceptance or the rejection of the request associated with the network slice is in accordance with a threshold proportion of the set of cells satisfying the latency threshold.

In some implementations, the communications manager 920 is capable of, configured to, or operable to support a means for transmitting or otherwise outputting, to a database, an indication of the PRB allocation for the network slice, the indication of the acceptance or the rejection of the request associated with the network slice, or both.

In some implementations, the communications manager 920 is capable of, configured to, or operable to support a means for reserving, in accordance with the PRB allocation for the network slice, a set of multiple PRBs for the network slice for a time period.

In some implementations, the communications manager 920 is capable of, configured to, or operable to support a means for transmitting or otherwise outputting an indication of an activation of the network slice for the time period in accordance with the reserving the set of multiple PRBs for the network slice. In some implementations, the communications manager 920 is capable of, configured to, or operable to support a means for transmitting or otherwise outputting an indication of a deactivation of the network slice in accordance with an expiration of the time period.

In some implementations, selecting the PRB allocation for the network slice is in accordance with one or more parameters associated with the network slice, the one or more parameters including the load information, a frequency band associated with the network slice, a quantity of UEs associated with the network slice, a type of environment of the network slice, a UE traffic distribution associated with the network slice, a cell morphology associated with the network slice, a CQI associated with the network slice, an MCS associated with the network slice, or a combination thereof.

In some implementations, to support selecting the PRB allocation for the network slice, the communications manager 920 is capable of, configured to, or operable to support a means for selecting a respective PRB allocation of the network slice for each cell of a set of cells of the wireless network associated with the network slice in accordance with the one or more parameters associated with the network slice. In some implementations, the PRB allocation for the network slice is in accordance with the network slice satisfying the latency threshold for a threshold proportion of the quantity of UEs associated with the network slice.

In some implementations, the communications manager 920 is capable of, configured to, or operable to support a means for training a first machine learning model to output the PRB allocation for the network slice in accordance with the latency threshold and the load information. In some implementations, to support training the first machine learning model, the communications manager 920 is capable of, configured to, or operable to support a means for providing, as a first training set associated with the first machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof. In some implementations, to support training the first machine learning model, the communications manager 920 is capable of, configured to, or operable to support a means for receiving or otherwise obtaining, in accordance with deployment of the network slice in the wireless network, information indicative of one or more performance indicators associated with the network slice. In some implementations, to support training the first machine learning model, the communications manager 920 is capable of, configured to, or operable to support a means for updating the first machine learning model in accordance with the one or more performance indicators.

In some implementations, the communications manager 920 is capable of, configured to, or operable to support a means for training a second machine learning model to output the indication of the acceptance or the rejection of the request associated with the network slice in accordance with the PRB allocation for the network slice, a respective PRB utilization for each cell of a set of cells of the wireless network associated with the network slice, one or more radio frequency metrics associated with the set of cells, a morphology associated with the set of cells, or a combination thereof. In some implementations, to support training the second machine learning model, the communications manager 920 is capable of, configured to, or operable to support a means for providing, as a second training set associated with the second machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof. In some implementations, to support training the second machine learning model, the communications manager 920 is capable of, configured to, or operable to support a means for receiving or otherwise obtaining, in accordance with deployment of the network slice in the wireless network, information indicative of one or more performance indicators associated with the network slice. In some implementations, to support training the second machine learning model, the communications manager 920 is capable of, configured to, or operable to support a means for updating the second machine learning model in accordance with the one or more performance indicators.

In some implementations, the load information includes simulated load information for a set of cells of the wireless network associated with the network slice, observed load information for the set of cells of the wireless network associated with the network slice, or both.

In some implementations, the communications manager 920 may be configured to perform various operations (such as receiving, obtaining, monitoring, outputting, transmitting) using or otherwise in cooperation with the transceiver 910, the one or more antennas 915 (where applicable), or any combination thereof. Although the communications manager 920 is illustrated as a separate component, in some implementations, one or more functions described with reference to the communications manager 920 may be supported by or performed by the transceiver 910, one or more of the at least one processor 935, one or more of the at least one memory 925, the code 930, or any combination thereof (such as by a processing system including at least a portion of the at least one processor 935, the at least one memory 925, the code 930, or any combination thereof). For example, the code 930 may include instructions executable by one or more of the at least one processor 935 to cause the device 905 to perform various aspects of network slice feasibility assessment for a latency-based SLA as described herein, or the at least one processor 935 and the at least one memory 925 may be otherwise configured to, individually or collectively, perform or support such operations.

FIG. 10 shows a flowchart illustrating a method 1000 that supports a network slice feasibility assessment for a latency-based SLA. The operations of the method 1000 may be implemented by a network entity or its components as described herein. For example, the operations of the method 1000 may be performed by a network entity as described with reference to FIGS. 1-9. In some implementations, a network entity may execute a set of instructions to control the functional elements of the network entity to perform the described functions. Additionally, or alternatively, the network entity may perform aspects of the described functions using special-purpose hardware.

At 1005, the method may include receiving a request associated with a network slice of the wireless network, the request indicating a latency threshold associated with an SLA of the network slice. The operations of 1005 may be performed in accordance with examples as disclosed herein.

At 1010, the method may include receiving load information associated with the network slice of the wireless network. The operations of 1010 may be performed in accordance with examples as disclosed herein.

At 1015, the method may include selecting, in accordance with the latency threshold and the load information, a PRB allocation for the network slice. The operations of 1015 may be performed in accordance with examples as disclosed herein.

At 1020, the method may include transmitting, to an NSMF and in accordance with the PRB allocation for the network slice, an indication of an acceptance or a rejection of the request associated with the network slice. The operations of 1020 may be performed in accordance with examples as disclosed herein.

Implementation examples are described in the following numbered clauses:

Aspect 1: A device associated with service management of a wireless network, including: a processing system that includes processor circuitry and memory circuitry that stores code, the processing system configured to cause the device to: obtain a request associated with a network slice of the wireless network, the request indicating a latency threshold associated with an SLA of the network slice; obtain load information associated with the network slice of the wireless network; select, in accordance with the latency threshold and the load information, a PRB allocation for the network slice; and output, to an NSMF and in accordance with the PRB allocation for the network slice, an indication of an acceptance or a rejection of the request associated with the network slice.

Aspect 2: The device of aspect 1, where: the request associated with the network slice further indicates a throughput threshold associated with the SLA of the network slice; and the PRB allocation for the network slice is selected further in accordance with the throughput threshold.

Aspect 3: The device of either of aspects 1 or 2, where the request associated with the network slice is obtained from the NSMF.

Aspect 4: The device of any of aspects 1-3, where the processing system is further configured to cause the device to: select, in accordance with the PRB allocation for the network slice, a respective PRB allocation of the network slice for each cell of a set of cells of the wireless network associated with the network slice, where the indication of the acceptance or the rejection of the request associated with the network slice is in accordance with a respective PRB utilization at each cell of the set of cells and the respective PRB allocation of the network slice for each cell of the set of cells.

Aspect 5: The device of aspect 4, where the processing system is further configured to cause the device to: output an indication of the respective PRB allocation of the network slice for each cell of the set of cells.

Aspect 6: The device of either of aspects 4 or 5, where the indication of the acceptance or the rejection of the request associated with the network slice is in accordance with a threshold proportion of the set of cells satisfying the latency threshold.

Aspect 7: The device of any of aspects 1-6, where the processing system is further configured to cause the device to: output, to a database, an indication of the PRB allocation for the network slice, the indication of the acceptance or the rejection of the request associated with the network slice, or both.

Aspect 8: The device of any of aspects 1-7, where the processing system is further configured to cause the device to: reserve, in accordance with the PRB allocation for the network slice, a set of multiple PRBs for the network slice for a time period.

Aspect 9: The device of aspect 8, where the processing system is further configured to cause the device to: output an indication of an activation of the network slice for the time period in accordance with the reserving the set of multiple PRBs for the network slice; and output an indication of a deactivation of the network slice in accordance with an expiration of the time period.

Aspect 10: The device of any of aspects 1-9, where selecting the PRB allocation for the network slice is in accordance with one or more parameters associated with the network slice, the one or more parameters including: the load information, a frequency band associated with the network slice, a quantity of UEs associated with the network slice, a type of environment of the network slice, a UE traffic distribution associated with the network slice, a cell morphology associated with the network slice, a CQI associated with the network slice, an MCS associated with the network slice, or a combination thereof.

Aspect 11: The device of aspect 10, where, to select the PRB allocation for the network slice, the processing system is configured to cause the device to: select a respective PRB allocation of the network slice for each cell of a set of cells of the wireless network associated with the network slice in accordance with the one or more parameters associated with the network slice.

Aspect 12: The device of either of aspects 10 or 11, where the PRB allocation for the network slice is in accordance with the network slice satisfying the latency threshold for a threshold proportion of the quantity of UEs associated with the network slice.

Aspect 13: The device of any of aspects 1-12, where the processing system is further configured to cause the device to: train a first ML model to output the PRB allocation for the network slice in accordance with the latency threshold and the load information.

Aspect 14: The device of aspect 13, where, to train the first ML model, the processing system is configured to cause the device to: provide, as a first training set associated with the first ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 15: The device of either of aspects 13 or 14, where, to train the first ML model, the processing system is configured to cause the device to: obtain, in accordance with deployment of the network slice in the wireless network, information indicative of one or more performance indicators associated with the network slice; and update the first ML model in accordance with the one or more performance indicators.

Aspect 16: The device of any of aspects 1-15, where the processing system is further configured to cause the device to: train a second ML model to output the indication of the acceptance or the rejection of the request associated with the network slice in accordance with the PRB allocation for the network slice, a respective PRB utilization for each cell of a set of cells of the wireless network associated with the network slice, one or more RF metrics associated with the set of cells, a morphology associated with the set of cells, or a combination thereof.

Aspect 17: The device of aspect 16, where, to train the second ML model, the processing system is configured to cause the device to: provide, as a second training set associated with the second ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 18: The device of either of aspects 16 or 17, where, to train the second ML model, the processing system is configured to cause the device to: obtain, in accordance with deployment of the network slice in the wireless network, information indicative of one or more performance indicators associated with the network slice; and update the second ML model in accordance with the one or more performance indicators.

Aspect 19: The device of any of aspects 1-18, where the load information includes simulated load information for a set of cells of the wireless network associated with the network slice, observed load information for the set of cells of the wireless network associated with the network slice, or both.

Aspect 20: A method for network slice management for a wireless network, including: receiving a request associated with a network slice of the wireless network, the request indicating a latency threshold associated with an SLA of the network slice; receiving load information associated with the network slice of the wireless network; selecting, in accordance with the latency threshold and the load information, a PRB allocation for the network slice; and transmitting, to an NSMF and in accordance with the PRB allocation for the network slice, an indication of an acceptance or a rejection of the request associated with the network slice.

Aspect 21: The method of aspect 20, where: the request associated with the network slice further indicates a throughput threshold associated with the SLA of the network slice; and the PRB allocation for the network slice is selected further in accordance with the throughput threshold.

Aspect 22: The method of either of aspects 20 or 21, where the request associated with the network slice is received from the NSMF.

Aspect 23: The method of any of aspects 20-22, further including: selecting, in accordance with the PRB allocation for the network slice, a respective PRB allocation of the network slice for each cell of a set of cells of the wireless network associated with the network slice, where the indication of the acceptance or the rejection of the request associated with the network slice is in accordance with a respective PRB utilization at each cell of the set of cells and the respective PRB allocation of the network slice for each cell of the set of cells.

Aspect 24: The method of aspect 23, further including: transmitting an indication of the respective PRB allocation of the network slice for each cell of the set of cells.

Aspect 25: The method of either of aspects 23 or 24, where the indication of the acceptance or the rejection of the request associated with the network slice is in accordance with a threshold proportion of the set of cells satisfying the latency threshold.

Aspect 26: The method of any of aspects 20-25, further including: transmitting, to a database, an indication of the PRB allocation for the network slice, the indication of the acceptance or the rejection of the request associated with the network slice, or both.

Aspect 27: The method of any of aspects 20-26, further including: reserving, in accordance with the PRB allocation for the network slice, a set of multiple PRBs for the network slice for a time period.

Aspect 28: The method of aspect 27, further including: transmitting an indication of an activation of the network slice for the time period in accordance with the reserving the set of multiple PRBs for the network slice; and transmitting an indication of a deactivation of the network slice in accordance with an expiration of the time period.

Aspect 29: The method of any of aspects 20-28, where selecting the PRB allocation for the network slice is in accordance with one or more parameters associated with the network slice, the one or more parameters including: the load information, a frequency band associated with the network slice, a quantity of UEs associated with the network slice, a type of environment of the network slice, a UE traffic distribution associated with the network slice, a cell morphology associated with the network slice, a CQI associated with the network slice, an MCS associated with the network slice, or a combination thereof.

Aspect 30: The method of aspect 29, where selecting the PRB allocation for the network slice includes: selecting a respective PRB allocation of the network slice for each cell of a set of cells of the wireless network associated with the network slice in accordance with the one or more parameters associated with the network slice.

Aspect 31: The method of either of aspects 29 or 30, where the PRB allocation for the network slice is in accordance with the network slice satisfying the latency threshold for a threshold proportion of the quantity of UEs associated with the network slice.

Aspect 32: The method of any of aspects 20-31, further including: training a first ML model to output the PRB allocation for the network slice in accordance with the latency threshold and the load information.

Aspect 33: The method of aspect 32, where training the first ML model includes: providing, as a first training set associated with the first ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 34: The method of either of aspects 32 or 33, where training the first ML model includes: receiving, in accordance with deployment of the network slice in the wireless network, information indicative of one or more performance indicators associated with the network slice; and updating the first ML model in accordance with the one or more performance indicators.

Aspect 35: The method of any of aspects 20-34, further including: training a second ML model to output the indication of the acceptance or the rejection of the request associated with the network slice in accordance with the PRB allocation for the network slice, a respective PRB utilization for each cell of a set of cells of the wireless network associated with the network slice, one or more RF metrics associated with the set of cells, a morphology associated with the set of cells, or a combination thereof.

Aspect 36: The method of aspect 35, where training the second ML model includes: providing, as a second training set associated with the second ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 37: The method of either of aspects 35 or 36, where training the second ML model includes: receiving, in accordance with deployment of the network slice in the wireless network, information indicative of one or more performance indicators associated with the network slice; and updating the second ML model in accordance with the one or more performance indicators.

Aspect 38: The method of any of aspects 20-37, where the load information includes simulated load information for a set of cells of the wireless network associated with the network slice, observed load information for the set of cells of the wireless network associated with the network slice, or both.

Aspect 39: A device associated with service management of a wireless network, including: means for receiving a request associated with a network slice of the wireless network, the request indicating a latency threshold associated with an SLA of the network slice; means for receiving load information associated with the network slice of the wireless network; means for selecting, in accordance with the latency threshold and the load information, a PRB allocation for the network slice; and means for transmitting, to an NSMF and in accordance with the PRB allocation for the network slice, an indication of an acceptance or a rejection of the request associated with the network slice.

Aspect 40: The device of aspect 39, where: the request associated with the network slice further indicates a throughput threshold associated with the SLA of the network slice; and the PRB allocation for the network slice is selected further in accordance with the throughput threshold.

Aspect 41: The device of either of aspects 39 or 40, where the request associated with the network slice is received from the NSMF.

Aspect 42: The device of any of aspects 39-41, further including: means for selecting, in accordance with the PRB allocation for the network slice, a respective PRB allocation of the network slice for each cell of a set of cells of the wireless network associated with the network slice, where the indication of the acceptance or the rejection of the request associated with the network slice is in accordance with a respective PRB utilization at each cell of the set of cells and the respective PRB allocation of the network slice for each cell of the set of cells.

Aspect 43: The device of aspect 42, further including: means for transmitting an indication of the respective PRB allocation of the network slice for each cell of the set of cells.

Aspect 44: The device of either of aspects 42 or 43, where the indication of the acceptance or the rejection of the request associated with the network slice is in accordance with a threshold proportion of the set of cells satisfying the latency threshold.

Aspect 45: The device of any of aspects 39-44, further including: means for transmitting, to a database, an indication of the PRB allocation for the network slice, the indication of the acceptance or the rejection of the request associated with the network slice, or both.

Aspect 46: The device of any of aspects 39-45, further including: means for reserving, in accordance with the PRB allocation for the network slice, a set of multiple PRBs for the network slice for a time period.

Aspect 47: The device of aspect 46, further including: means for transmitting an indication of an activation of the network slice for the time period in accordance with the reserving the set of multiple PRBs for the network slice; and means for transmitting an indication of a deactivation of the network slice in accordance with an expiration of the time period.

Aspect 48: The device of any of aspects 39-47, where selecting the PRB allocation for the network slice is in accordance with one or more parameters associated with the network slice, the one or more parameters including: the load information, a frequency band associated with the network slice, a quantity of UEs associated with the network slice, a type of environment of the network slice, a UE traffic distribution associated with the network slice, a cell morphology associated with the network slice, a CQI associated with the network slice, an MCS associated with the network slice, or a combination thereof.

Aspect 49: The device of aspect 48, where the means for selecting the PRB allocation for the network slice include: means for selecting a respective PRB allocation of the network slice for each cell of a set of cells of the wireless network associated with the network slice in accordance with the one or more parameters associated with the network slice.

Aspect 50: The device of either of aspects 48 or 49, where the PRB allocation for the network slice is in accordance with the network slice satisfying the latency threshold for a threshold proportion of the quantity of UEs associated with the network slice.

Aspect 51: The device of any of aspects 39-50, further including: means for training a first ML model to output the PRB allocation for the network slice in accordance with the latency threshold and the load information.

Aspect 52: The device of aspect 51, where the means for training the first ML model include: means for providing, as a first training set associated with the first ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 53: The device of either of aspects 51 or 52, where the means for training the first ML model include: means for receiving, in accordance with deployment of the network slice in the wireless network, information indicative of one or more performance indicators associated with the network slice; and means for updating the first ML model in accordance with the one or more performance indicators.

Aspect 54: The device of any of aspects 39-53, further including: means for training a second ML model to output the indication of the acceptance or the rejection of the request associated with the network slice in accordance with the PRB allocation for the network slice, a respective PRB utilization for each cell of a set of cells of the wireless network associated with the network slice, one or more RF metrics associated with the set of cells, a morphology associated with the set of cells, or a combination thereof.

Aspect 55: The device of aspect 54, where the means for training the second ML model include: means for providing, as a second training set associated with the second ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 56: The device of either of aspects 54 or 55, where the means for training the second ML model include: means for receiving, in accordance with deployment of the network slice in the wireless network, information indicative of one or more performance indicators associated with the network slice; and means for updating the second ML model in accordance with the one or more performance indicators.

Aspect 57: The device of any of aspects 39-56, where the load information includes simulated load information for a set of cells of the wireless network associated with the network slice, observed load information for the set of cells of the wireless network associated with the network slice, or both.

Aspect 58: A non-transitory computer-readable medium storing code for network slice management in a wireless network, the code including instructions executable by a processing system to: obtain a request associated with a network slice of the wireless network, the request indicating a latency threshold associated with an SLA of the network slice; obtain load information associated with the network slice of the wireless network; select, in accordance with the latency threshold and the load information, a PRB allocation for the network slice; and output, to an NSMF and in accordance with the PRB allocation for the network slice, an indication of an acceptance or a rejection of the request associated with the network slice.

Aspect 59: The non-transitory computer-readable medium of aspect 58, where: the request associated with the network slice further indicates a throughput threshold associated with the SLA of the network slice; and the PRB allocation for the network slice is selected further in accordance with the throughput threshold.

Aspect 60: The non-transitory computer-readable medium of either of aspects 58 or 59, where the request associated with the network slice is obtained from the NSMF.

Aspect 61: The non-transitory computer-readable medium of any of aspects 58-60, where the instructions are further executable by the processing system to: select, in accordance with the PRB allocation for the network slice, a respective PRB allocation of the network slice for each cell of a set of cells of the wireless network associated with the network slice, where the indication of the acceptance or the rejection of the request associated with the network slice is in accordance with a respective PRB utilization at each cell of the set of cells and the respective PRB allocation of the network slice for each cell of the set of cells.

Aspect 62: The non-transitory computer-readable medium of aspect 61, where the instructions are further executable by the processing system to: output an indication of the respective PRB allocation of the network slice for each cell of the set of cells.

Aspect 63: The non-transitory computer-readable medium of either of aspects 61 or 62, where the indication of the acceptance or the rejection of the request associated with the network slice is in accordance with a threshold proportion of the set of cells satisfying the latency threshold.

Aspect 64: The non-transitory computer-readable medium of any of aspects 58-63, where the instructions are further executable by the processing system to: output, to a database, an indication of the PRB allocation for the network slice, the indication of the acceptance or the rejection of the request associated with the network slice, or both.

Aspect 65: The non-transitory computer-readable medium of any of aspects 58-64, where the instructions are further executable by the processing system to: reserve, in accordance with the PRB allocation for the network slice, a set of multiple PRBs for the network slice for a time period.

Aspect 66: The non-transitory computer-readable medium of aspect 65, where the instructions are further executable by the processing system to: output an indication of an activation of the network slice for the time period in accordance with the reserving the set of multiple PRBs for the network slice; and output an indication of a deactivation of the network slice in accordance with an expiration of the time period.

Aspect 67: The non-transitory computer-readable medium of any of aspects 58-66, where selecting the PRB allocation for the network slice is in accordance with one or more parameters associated with the network slice, the one or more parameters including: the load information, a frequency band associated with the network slice, a quantity of UEs associated with the network slice, a type of environment of the network slice, a UE traffic distribution associated with the network slice, a cell morphology associated with the network slice, a CQI associated with the network slice, an MCS associated with the network slice, or a combination thereof.

Aspect 68: The non-transitory computer-readable medium of aspect 67, where the instructions to select the PRB allocation for the network slice are executable by the processing system to: select a respective PRB allocation of the network slice for each cell of a set of cells of the wireless network associated with the network slice in accordance with the one or more parameters associated with the network slice.

Aspect 69: The non-transitory computer-readable medium of either of aspects 67 or 68, where the PRB allocation for the network slice is in accordance with the network slice satisfying the latency threshold for a threshold proportion of the quantity of UEs associated with the network slice.

Aspect 70: The non-transitory computer-readable medium of any of aspects 58-69, where the instructions are further executable by the processing system to: train a first ML model to output the PRB allocation for the network slice in accordance with the latency threshold and the load information.

Aspect 71: The non-transitory computer-readable medium of aspect 70, where the instructions to train the first ML model are executable by the processing system to: provide, as a first training set associated with the first ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 72: The non-transitory computer-readable medium of either of aspects 70 or 71, where the instructions to train the first ML model are executable by the processing system to: obtain, in accordance with deployment of the network slice in the wireless network, information indicative of one or more performance indicators associated with the network slice; and update the first ML model in accordance with the one or more performance indicators.

Aspect 73: The non-transitory computer-readable medium of any of aspects 58-72, where the instructions are further executable by the processing system to: train a second ML model to output the indication of the acceptance or the rejection of the request associated with the network slice in accordance with the PRB allocation for the network slice, a respective PRB utilization for each cell of a set of cells of the wireless network associated with the network slice, one or more RF metrics associated with the set of cells, a morphology associated with the set of cells, or a combination thereof.

Aspect 74: The non-transitory computer-readable medium of aspect 73, where the instructions to train the second ML model are executable by the processing system to: provide, as a second training set associated with the second ML model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or a combination thereof.

Aspect 75: The non-transitory computer-readable medium of either of aspects 73 or 74, where the instructions to train the second ML model are executable by the processing system to: obtain, in accordance with deployment of the network slice in the wireless network, information indicative of one or more performance indicators associated with the network slice; and update the second ML model in accordance with the one or more performance indicators.

Aspect 76: The non-transitory computer-readable medium of any of aspects 58-75, where the load information includes simulated load information for a set of cells of the wireless network associated with the network slice, observed load information for the set of cells of the wireless network associated with the network slice, or both.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a graphics processing unit (GPU), a neural processing unit (NPU), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A device associated with service management of a wireless network, comprising:
   a processing system that includes processor circuitry and memory circuitry that stores code, the processing system configured to cause the device to:
      obtain a request associated with a network slice of the wireless network, the request indicating a latency threshold associated with a service level agreement (SLA) of the network slice;
      obtain load information associated with the network slice of the wireless network;
      predict, in accordance with the latency threshold and the load information, a physical resource block (PRB) allocation for the network slice that satisfies the request; and
      output, to a network slice management function (NSMF) and in accordance with the predicted PRB allocation for the network slice and a resource capacity of the network slice, an indication of an acceptance or a rejection of the request associated with the network slice.

2. The device of claim 1, wherein:
   the request associated with the network slice further indicates a throughput threshold associated with the SLA of the network slice; and
   the PRB allocation for the network slice is predicted selected further in accordance with the throughput threshold.

3. The device of claim 1, wherein the request associated with the network slice is obtained from the NSMF.

4. The device of claim 1, wherein the processing system is further configured to cause the device to:
   predict, in accordance with the predicted PRB allocation for the network slice, a respective PRB allocation of the network slice for each cell of a set of cells of the wireless network associated with the network slice,
      wherein the indication of the acceptance or the rejection of the request associated with the network slice is in accordance with a respective PRB utilization at each cell of the set of cells and the predicted respective PRB allocation of the network slice for each cell of the set of cells.

5. The device of claim 4, wherein the processing system is further configured to cause the device to:
   output an indication of the predicted respective PRB allocation of the network slice for each cell of the set of cells.

6. The device of claim 4, wherein the indication of the acceptance or the rejection of the request associated with the network slice is in accordance with a threshold proportion of the set of cells satisfying the latency threshold.

7. The device of claim 1, wherein the processing system is further configured to cause the device to:
   reserve, in accordance with the predicted PRB allocation for the network slice, a plurality of PRBs for the network slice for a time period.

8. The device of claim 7, wherein the processing system is further configured to cause the device to:
   output an indication of an activation of the network slice for the time period in accordance with the reserving the plurality of PRBs for the network slice; and
   output an indication of a deactivation of the network slice in accordance with an expiration of the time period.

9. The device of claim 1, wherein predicting the PRB allocation for the network slice is in accordance with one or more parameters associated with the network slice,
   the one or more parameters comprising:
      the load information, a frequency band associated with the network slice, a quantity of user equipment (UEs) associated with the network slice, a type of environment of the network slice, a UE traffic distribution associated with the network slice, a cell morphology associated with the network slice, a channel quality indicator (CQI) associated with the network slice, a modulation and coding scheme (MCS) associated with the network slice, or a combination thereof.

10. The device of claim 9, wherein, to predict the PRB allocation for the network slice, the processing system is configured to cause the device to:
   predict a respective PRB allocation of the network slice for each cell of a set of cells of the wireless network associated with the network slice in accordance with the one or more parameters associated with the network slice.

11. The device of claim 9, wherein the predicted PRB allocation for the network slice is in accordance with the network slice satisfying the latency threshold for a threshold proportion of the quantity of UEs associated with the network slice.

12. The device of claim 1, wherein the load information comprises simulated load information for a set of cells of the wireless network associated with the network slice, observed load information for the set of cells of the wireless network associated with the network slice, or both.

13. A method for network slice management for a wireless network, comprising:

receiving, at a device associated with service management of the wireless network, a request associated with a network slice of the wireless network, the request indicating a latency threshold associated with a service level agreement (SLA) of the network slice;

receiving load information associated with the network slice of the wireless network;

predicting, in accordance with the latency threshold and the load information, a physical resource block (PRB) allocation for the network slice that satisfies the request; and transmitting, to a network slice management function (NSMF) and in accordance with the predicted PRB allocation for the network slice and a resource capacity of the network slice, an indication of an acceptance or a rejection of the request associated with the network slice.

14. The method of claim 13, wherein:

the request associated with the network slice further indicates a throughput threshold associated with the SLA of the network slice; and the PRB allocation for the network slice is predicted further in accordance with the throughput threshold.

15. The method of claim 13, wherein the request associated with the network slice is received from the NSMF.

16. The method of claim 13, further comprising:

predicting, in accordance with the predicted PRB allocation for the network slice, a respective PRB allocation of the network slice for each cell of a set of cells of the wireless network associated with the network slice, wherein the indication of the acceptance or the rejection of the request associated with the network slice is in accordance with a respective PRB utilization at each cell of the set of cells and the predicted respective PRB allocation of the network slice for each cell of the set of cells.

17. The method of claim 16, further comprising:

transmitting an indication of the predicted respective PRB allocation of the network slice for each cell of the set of cells.

18. The method of claim 16, wherein the indication of the acceptance or the rejection of the request associated with the network slice is in accordance with a threshold proportion of the set of cells satisfying the latency threshold.

19. The method of claim 13, further comprising:

reserving, in accordance with the predicted PRB allocation for the network slice, a plurality of PRBs for the network slice for a time period.

20. The method of claim 19, further comprising:

transmitting an indication of an activation of the network slice for the time period in accordance with the reserving the plurality of PRBs for the network slice; and transmitting an indication of a deactivation of the network slice in accordance with an expiration of the time period.

21. The method of claim 13, wherein predicting the PRB allocation for the network slice is in accordance with one or more parameters associated with the network slice, the one or more parameters comprising:

the load information, a frequency band associated with the network slice, a quantity of user equipment (UEs) associated with the network slice, a type of environment of the network slice, a UE traffic distribution associated with the network slice, a cell morphology associated with the network slice, a channel quality indicator (CQI) associated with the network slice, a modulation and coding scheme (MCS) associated with the network slice, or a combination thereof.

22. The method of claim 21, wherein predicting the PRB allocation for the network slice comprises:

predicting a respective PRB allocation of the network slice for each cell of a set of cells of the wireless network associated with the network slice in accordance with the one or more parameters associated with the network slice.

23. The method of claim 21, wherein the predicted PRB allocation for the network slice is in accordance with the network slice satisfying the latency threshold for a threshold proportion of the quantity of UEs associated with the network slice.

24. The method of claim 13, wherein the load information comprises simulated load information for a set of cells of the wireless network associated with the network slice, observed load information for the set of cells of the wireless network associated with the network slice, or both.

25. A non-transitory computer-readable medium storing code for network slice management in a wireless network, the code comprising instructions executable by a processing system to:

obtain a request associated with a network slice of the wireless network, the request indicating a latency threshold associated with a service level agreement (SLA) of the network slice;

obtain load information associated with the network slice of the wireless network;

predict, in accordance with the latency threshold and the load information, a physical resource block (PRB) allocation for the network slice that satisfies the request; and output, to a network slice management function (NSMF) and in accordance with the predicted PRB allocation for the network slice and a resource capacity of the network slice, an indication of an acceptance or a rejection of the request associated with the network slice.

26. The non-transitory computer-readable medium of claim 25, wherein:

the request associated with the network slice further indicates a throughput threshold associated with the SLA of the network slice; and the PRB allocation for the network slice is predicted further in accordance with the throughput threshold.

27. The non-transitory computer-readable medium of claim 25, wherein the request associated with the network slice is obtained from the NSMF.

28. The non-transitory computer-readable medium of claim 25, wherein the instructions are further executable by the processing system to:

predict, in accordance with the predicted PRB allocation for the network slice, a respective PRB allocation of the network slice for each cell of a set of cells of the wireless network associated with the network slice,
wherein the indication of the acceptance or the rejection of the request associated with the network slice is in accordance with a respective PRB utilization at each cell of the set of cells and the predicted respective PRB allocation of the network slice for each cell of the set of cells.

29. The non-transitory computer-readable medium of claim 28, wherein the instructions are further executable by the processing system to:
output an indication of the predicted respective PRB allocation of the network slice for each cell of the set of cells.

* * * * *